US005153618A

United States Patent [19]

Frank et al.

[11] Patent Number: 5,153,618

[45] Date of Patent: Oct. 6, 1992

[54] IONOGRAPHIC IMAGING SYSTEM

[75] Inventors: John A. Frank, Webster; Joseph Mammino, Penfield; Dennis A. Abramsohn, Pittsford; Donald S. Sypula, Penfield; Jerome P. Chasko, Williamson; William L. Gary, Lyons; Deborah J. Nichol-Landry, Rochester; Fred W. Schmidlin, Pittsford, all of N.Y.; Dasarao K. Murti, Mississauga, Canada; Brian E. Springett, Rochester, N.Y.

[73] Assignee: Xerox Corporation, Stamford, Conn.

[21] Appl. No.: 744,158

[22] Filed: Aug. 13, 1991

Related U.S. Application Data

[62] Division of Ser. No. 459,401, Dec. 29, 1989, Pat. No. 5,073,434.

[51] Int. Cl.[5] ........................................ G01D 15/06

[52] U.S. Cl. ........................................ 346/159

[58] Field of Search ........................................ 346/159

[56] References Cited

U.S. PATENT DOCUMENTS

| | | | |
|---|---|---|---|
| 3,725,951 | 4/1973 | McCurry . | |
| 3,742,516 | 6/1973 | Cavanaugh et al. . | |
| 3,967,959 | 7/1976 | Goffe et al. . | |
| 3,976,484 | 8/1976 | Ando et al. . | |
| 4,023,894 | 5/1977 | Goel | 346/159 |
| 4,137,537 | 1/1979 | Takahashi et al. . | |
| 4,143,965 | 3/1979 | Ando et al. . | |
| 4,168,974 | 9/1979 | Ando et al. . | |
| 4,284,697 | 8/1981 | Ando et al. . | |
| 4,410,584 | 10/1983 | Toba et al. . | |
| 4,435,066 | 3/1984 | Tarumi et al. . | |
| 4,463,363 | 7/1984 | Gundlach et al. . | |
| 4,474,850 | 10/1984 | Burwasser . | |
| 4,481,244 | 11/1984 | Haruta et al. . | |
| 4,491,855 | 1/1985 | Fujii et al. . | |
| 4,503,111 | 3/1985 | Jaeger et al. . | |
| 4,524,371 | 6/1985 | Sheridon et al. . | |
| 4,535,345 | 8/1985 | Wilcox et al. . | |
| 4,538,163 | 8/1985 | Sheridon . | |
| 4,584,592 | 4/1986 | Tuan et al. . | |
| 4,593,994 | 6/1986 | Tamura et al. . | |
| 4,644,373 | 2/1987 | Sheridon et al. . | |
| 5,039,598 | 8/1991 | Abramsohn et al. | 346/159 X |

FOREIGN PATENT DOCUMENTS

| | | | |
|---|---|---|---|
| 2164000A | 3/1986 | United Kingdom . | |

*Primary Examiner*—George H. Miller, Jr.
*Attorney, Agent, or Firm*—Peter H. Kondo

[57] ABSTRACT

An ionographic imaging member containing a conductive layer and a uniform and continuous dielectric imaging layer free of voids, the imaging layer having a dielectric constant of from about 1.5 to about 40 and a thickness of at least about 45 micrometers, the thickness divided by the dielectric constant having a value of from about 30 to about 60 micrometers. This member may be used in an ionographic imaging process.

16 Claims, 2 Drawing Sheets

IONOGRAPHIC IMAGING SYSTEM

This is a division of application Ser. No. 07/459,401, filed Dec. 29, 1989, now U.S. Pat. No. 5,073,434.

BACKGROUND OF THE INVENTION

This invention relates to an ionographic imaging system, and in particular, to an ionographic imaging member having a thick dielectric imaging layer and method of imaging with the thick ionographic imaging member.

In electrography, an electrostatic latent image is formed on a dielectric imaging layer (electroreceptor) by various techniques such as by an ion stream (ionography), stylus, shaped electrode, and the like. Development of the electrostatic latent image may be effected by the application of certain electrostatically charged marking particles.

Ion stream electrographic imaging may be accomplished with the aid of ion projection heads. Movement of the ion stream may be assisted by means of a fluid jet introduced into an ion projection head. For example, fluid jet assisted ion projection heads in electrographic marking apparatus for ion projection printing may utilize ions generated in a chamber, entrained in a rapidly moving fluid stream passing into, through and out of the chamber, modulated in an electroded exit zone by being selectively emitted or inhibited therein, and finally deposited in an imagewise pattern on a relatively movable charge receptor (electroceptor). More specifically, the ion projection head may comprise a source of ionizable, pressurized transport fluid, such as air, and an ion generation housing, having a highly efficient entrainment structure and a modulation structure. Within the ion generation housing there is a corona generator comprising a conductive chamber surrounding a wire, and an entrainment structure which comprises an inlet opening for connecting the source of ionizable fluid into the chamber and for directing the fluid through the corona generator, and an outlet opening for removing ion entraining transport fluid from the chamber. The exiting ion laden transport fluid is directed adjacent to the modulation structure for turning "on" and "off" the ion flow to the charge receptor surface. The chamber, the corona generating source, the inlet opening, the outlet opening and the modulation structure each extends in a direction transverse to the direction of relative movement of the electroceptor. The electroceptor may be uniformly charged by suitable means such as a corona charging device, brush charging, induction charging devices and the like, prior to imagewise discharge of the uniformly charged electroceptor by means of a fluid jet assisted ion projection head. In conventional xerography, corona charging is carried out with a device having a high charge output and a large opening such as a corotron so that a high voltage may be deposited on thick photoconductive insulating layers. A thin electroceptor of less than one half mil having a dielectric constant of about 2 or 3 will not charge up to high electric potentials used in conventional xerography on thick photoconductive insulating layers. Thus, if such an electroceptor is employed in an ordinary ion projection electrographic printing system and is uniformly charged with a device having a high charge output and a large opening such as a corotron, it cannot be charged to high electric potentials. In ionographic systems utilizing fluid jet assisted ion projection heads, only a small amount of ions are emitted due to modulation requirements. Therefore, imagewise discharge of a uniformly charged electroceptor by means of a fluid jet assisted ion projection head results in only a slight change in potential and development density of the electrostatic latent image is poor due to low contrast potential. In U.S. Pat. No. 4,524,371 to N. Sheridon et al, issued Jun. 18, 1985, a fluid jet assisted ion projection printing apparatus is described comprising a housing including ion generating and ion modulating regions. The fluid jet dislodges ions from an electrically biased wire and requires high flow rates to achieve higher deposited charge density. Unfortunately, high fluid flow rates cause a high decibel whistling sound due to the blowers and pumps used to move the fluids. High voltage ion beam deposition is also difficult to achieve when utilizing modulation voltage switching. In addition to the whistling noise problem, it is difficult to obtain more charge out of an ion stream imaging device per unit time. This adversely affects the rotational speed of the electroceptor, i.e. a slower speed electroceptor is needed to achieve a higher charge density. Therefore, one of the drawbacks of ionography is the relatively low charge density and low surface potential which can be supplied to an electroceptor surface while simultaneously attempting to achieve adequate image resolution, print density and throughput speed. Thus, the surface charge potential on the electroceptor in ionographic imaging systems has been considered to be too low for typical dry xerographic development. In other words, although one may form an electrostatic latent image on a thin high dielectric constant electroceptor by means of ordinary ion projection printing systems, the voltage achieved is not high enough for development with a dry, conventional xerographic two-component magnetic brush developer utilizing carrier particles having an electrically insulating outer surface. Thin dielectric imaging layers result in less voltage on the surface and fewer toner particles are pulled from the development system for deposition onto the electroceptor imaging surface. This results in low density toner images due to a combination of low charge density and low voltage. It has, therefore, been generally accepted that high resolution, dense image ionography precludes the use of virtually all the standard dry toner development systems because the achievable development fields (or surface potential) falls below the necessary working range. The underlying reason normally given for this is that the electroceptor has to be very thin or have a low electric field from the image charges in order to accept charge without excessive spreading (blooming) of the deposited charge, yet the electroceptor must be thick enough to provide fields strong enough to drive development. The latter was generally not attainable without also having fields high enough to cause excessive blooming. So the remaining choice was to focus on high charge density and seek a development system which could develop weak fields (e.g. development with liquid ink or single component conductive magnetic brushes containing marking particles having an average particle size of between about 0.1 micrometer and about 15 micrometers). It was believed that the resolution and blooming characteristics were only related to surface charge and field (or surface potential) which were only a function of the dielectric thickness (physical thickness/dielectric constant). For example, in U.S. Pat. No. 4,410,584 to Ando et al issued Aug. 24, 1976, a dielectric imaging member is disclosed having a thickness of about 1 mil (25.4 micrometers). Other patents such as U.S. Pat. No. 4,463,363 to Gundlach et al. U.S. Pat. No. 4,524,371 to Sheridan et al. U.S. Pat. No. 4,644,373 to Sheridan et al, and U.S. Pat. No. 4,584,592 to Tuan et al merely mention a dielectric imaging member but do not appear to provide any dimensions. Some prior art systems have employed low charge modulating ion sources depositing charges of, for example, 17 to 20 nanocoulombs per $cm^2$. These low charges were too low to be operable with conventional two component development systems utilizing thin, low dielectric constant electroceptors. Further, thin electroceptor or dielectric imaging layer thicknesses are expensive and difficult to process because greater absolute uniformity is necessary to maintain the variance to a small set fraction of the total imaging layer thickness. Thickness variation in an ion stream electrographic imaging system is directly related to the uniformity of the image voltage which is directly related to the developed image quality.

Thus, the prior art ionographic imaging systems utilize low potential charge generating devices, emit an irritating whistling noise at high fluid jet rates and are generally unsuitable for development with standard dry two-component xerographic developers.

Other electrographic systems using dielectric materials such as aluminum oxide materials in the electroceptor exhibit low charge acceptance, high charge decay rates and lateral conduction under ordinary operating conditions. Since aluminum oxide materials are hygroscopic, the electroceptor must be run hot in order to avoid the adverse effects of large variations in ambient humidity [e.g. above 50 percent RH and 23.9° C. (75° F.)] such as image blurring and image retention after erase (ghosting). This electroceptor has too small a dielectric thickness for use in ionographic imaging systems utilizing low potential charge generating devices and standard two component dry xerographic toner development systems.

A stylus, instead of fluid jet ion projection, may be used to charge an electroceptor. Although a stylus is capable of charging dielectric imaging members to high potentials, the stylus itself and/or the imaging member can wear rapidly, produces undesirable fumes and can puncture the electroceptor.

Some prior art xerographic photoreceptors having a thickness of at least about 25 micrometers (1 mil) have been charged to relatively high voltages because of an unlimited power source such as a corotron which are not charge limited. Unfortunately, xerographic photoreceptors require expensive special shipping and storage treatment for protection from temperature extremes or fluctuations, exposure to sun light, contact with reactive fumes and the like. Moreover, special shutter systems, particularly automatic shutter systems, are required in xerographic machines to protect the photoreceptor when it is in use or when it is not in use. Further, photoreceptors are usually sensitive to heat and must be located a safe distance from fusers thereby limiting flexibility in machine architecture design. Also, photoreceptors are sensitive to toner filming. In addition, the coefficient of friction, surface energy and the like of photoreceptors materials, particularly the surface, cannot be readily tailored to accommodate different machine components such as blade cleaning systems. Moreover, cycle up and cycle down problems are a common characteristic of photoreceptors.

INFORMATION DISCLOSURE STATEMENT

In U.S. Pat. No. 4,524,371 to N. Sheridon et al, issued Jun. 18, 1985, a fluid jet assisted ion projection printing apparatus is disclosed comprising a housing including ion generation and ion modulating regions. Image resolution was limited by the number of spots per inch in the printing apparatus and density is a function of the use of a development electrode.

In U.S. Pat. No. 3,725,951 to McCurry, issued Apr. 3, 1973—a method of forming electrostatic images on a dielectric surface is disclosed by controlling the relative ion concentration in a gas stream moving through a channel and directed upon the dielectric surface. Relative ion concentration in the gas stream is controlled by selective application of electric fields to an array of channels. A-15 volt DC supply is employed for the electric fields. A dielectric medium may be precharged to a desired potential with a polarity opposite the ion polarity so that subsequent controlled application of ions forms a latent image on the precharged dielectric surface. The latent image passes through a developer and fixer, "both of which are well known in the art".

In U.S. Pat. No. 3,742,516 to Cavanaugh et al, issued Jun. 26, 1973—a printing head is disclosed for forming electrostatic images on a dielectric surface by using selective application of low voltage electric fields to control the relative ion concentration in a gas stream moving through a slot and directed upon the dielectric surface. A-15 volt DC supply is employed for the electric fields. A dielectric medium may be precharged with a desired potential with a polarity opposite the ion polarity so that subsequent controlled application of ions forms a latent image on the precharged dielectric surface. The latent image passes through a developer and fixer, "both of which are well known in the art".

In U.S. Pat. No. 4,593,994 to Tamura et al, issued Jun. 10, 1986—An ion flow modulator used in a photocopy machine is described. The ion flow modulator includes an insulating substrate, a common electrode formed on a major surface of the insulating substrate, a plurality of ion flow control electrodes, a photoconductive layer and various other components. Positively charged ions from the modulator form an electrostatic latent image on a dielectric drum which was previously charged with a uniform negative charge. Toner supplied from a toner hopper is attracted to the latent image and the resulting toner image is transferred to a copy sheet and fixed thereto. A specific dielectric drum is disclosed comprising a polyethylene terephthalate layer having a thickness of approximately 20 micrometers.

In U.S. Pat. No. 4,168,974 to Ando et al, issued Sep. 25, 1979—An electrophotographic process is disclosed in which an image is formed using a photosensitive screen having a plurality of tiny openings. Image exposure of the uniformly charged screen forms a primary electrostatic latent image on the screen that is employed to modulate ions moving through the screen between a corona ion flow source and screen whereby a secondary electrostatic latent image is formed on a recording member that was previously uniformly charged to a predetermined potential. An insulated recording drum is disclosed comprising a conductive substrate coated with an insulating layer. The electrostatic latent image on the recording drum may be developed by wet type or dry type developing means. The resulting toner image may be transferred to a copy sheet and fixed thereto. An insulating layer thickness of 25 micrometers and dielectricity K of 3 are specifically mentioned.

In U.S. Pat. No. 3,976,484 to Ando et al. issued Aug. 24, 1976—An electrophotographic process is disclosed in which an image is formed using a photosensitive screen having a plurality of fine openings. Image exposure of the uniformly charged screen forms a primary electrostatic latent image on the screen that is employed to modulate ions moving through the screen under an applied electric field between an ion flow source and screen whereby a secondary electrostatic latent image is formed on a chargeable recording member consisting of a conductive base and a thin chargeable layer of, for example, a thin layer of polyethylene terephthalate or sufficiently dried conventional paper. The secondary image may be formed on the recording member while it is on a supporting conductive roller applied with a bias voltage. The latent image is developed by a developer and fixed. Development systems employed appear to include liquid and magnetic brush developers.

In U.S. Pat. No. 4,137,537 to Takahashi et al, issued Jan. 30, 1979—Electrostatic transfer process and apparatus are disclosed. An insulating surface of a latent image forming material is uniformly charged with an electrostatic charge and the charge in the image forming areas of the insulating surface are subsequently erased by electric discharge from closely spaced pin electrodes. The resulting electrostatic latent image, in the presence of a development electrode, is developed with a developer having a charge of the same polarity as the voltage applied to the development electrode. A magnetic brush development method is disclosed as preferred using a developing bias voltage. The developed image is transferred to a paper sheet. The latent image forming material may comprise a conductive substrate, an undercoat layer of a first dielectric and a recording layer of a second dielectric. In one embodiment, the undercoat layer may have a low electric capacity ($C_2$=50-100 pF/$cm^2$) and medium electric resistivity ($\rho_2=10^6-10^9\Omega$-cm), and having a thickness of 30 to 80 micrometers. The recording layers have a high electric capacity ($C_1$=200-500 pF/$cm^2$), medium electric resistivity ($\rho_1=10^{12}-10^{15}\Omega$-cm), and a thickness of 15 to 50 micrometers. The specific inductivity ($\epsilon r_2$) of the undercoat layer was about 4.0 and the specific inductivity of the recording layer was about 7.0. Carbon or a metal oxide may be incorporated in an acrylic, epoxy or melamine resin to obtain the above electric resistivity and specific inductivity for the undercoat. Titanium oxide or the like can be incorporated in an acrylic, epoxy or melamine resin to increase electric capacity to obtain the above electric resistivity and specific inductivity for the recording layer.

In U.S. Pat. No. 4,410,584 to Toba et al, issued Oct. 18, 1983, an electrostatic recording member is disclosed comprising a recording layer, an electrically conductive layer and a support, wherein the electrically conductive layer is composed of electrically conductive micro-fine powder dispersed in a polymer binder. The recording layer may comprise various organic and inorganic dielectric materials listed, for example in column 4, lines 13-29, and may have a thickness of at 1 to 20 micrometers.

In U.S. Pat. No. 3,967,959 to Goffe et al, issued Jul. 6, 1976—a migration imaging system is disclosed in which a migration imaging member comprises a substrate, a softenable layer migration marking material, and an overlayer comprising various materials such as polystyrene, silicone resins, acrylic or cellulosic resins and many other materials, listed for example, in the paragraph bridging columns 6 and 7. The overcoating layer may have a thickness up to about 75 micrometers (if not electrically conductive). The surface of the migration imaging member may be electrically charged in imagewise configuration by various modes including charging or sensitizing through a mask or stencil, shaped electrodes, electron beam and numerous other techniques.

In U.S. Pat. No. 4,143,965 to Ando et al, issued Mar. 13, 1979—An electrophotographic process is disclosed in which an image is formed using a photosensitive screen having a plurality of tiny openings. Image exposure of the uniformly charged screen forms a primary electrostatic latent image on the screen that is employed to modulate ions moving through the screen between a corona ion flow source and screen whereby a secondary electrostatic latent image is formed on a chargeable recording member. An acceleration field is applied between the screen and the chargeable recording member. An insulative recording drum is disclosed comprising an aluminum drum coated with a 15 micrometer thick layer of insulating polycarbonate. The electrostatic latent image on the recording drum may be toner developed by a developing device and the resulting toner image may be transferred to paper and fused thereto.

In U.S. Pat. No. 4,284,697 to Ando et al, issued Aug. 18, 1981—An electrophotographic process is disclosed in which an image is formed using an arcuate photosensitive screen having a plurality of tiny openings. Image exposure of the uniformly charged screen forms a primary electrostatic latent image on the screen that is employed to modulate ions moving through the screen between a corona ion flow source and screen whereby a secondary electrostatic latent image is formed on a flat or arcuate recording member. The screen or recording member having the greater radius is rotated or moved at a higher velocity than the other. An insulated recording medium is disclosed such as recording paper or a drum comprising an aluminum substrate coated with a 15 $\mu$m thick layer of insulative material such as resin or the like provided by coating or adhesion. The electrostatic latent image on the recording drum may be developed by a developing means. The resulting toner image may be transferred to copy paper and fixed thereto. An insulating layer thickness of 25 micrometers and dielectricity K of 3 are specifically mentioned.

In U.S. Pat. No. 4,535,345 to Wilcox et al, issued Aug. 13, 1985—An ion projection apparatus is disclosed including sequentially, an imagewise charging station, a developing station and a fusing station for forming images on a charge receptor sheet. A backing electrode serves to accelerate charge deposition upon the receptor and to provide a counter charge to the latent image ion charge. The backing electrode extends from the ion projection region through the fusing region. The charge receptor sheet is preferably ordinary paper. A magnetic brush roller rotates through a sump of magnetic toner particles where it picks up toner and brushes it over the paper surface. As tendrils of linked toner particles extending from the roller are swept over the paper, a negative charge is induced on the particles and some are attracted to the positive surface charges of the established dipoles and adhere to the paper.

In GB 2 164 000 A to Xerox Corporation, published Mar. 12, 1986—A fluid assisted ion projection electrographic copier is disclosed comprising a modulation assembly having a photoconductive layer for controlling the flow of ions along an exit channel in accordance with a raster pattern projected from an original to be copied. Ions allowed to exit the modulation assembly are deposited on a receptor sheet, such as plain or dielectric paper, on a backing electrode. A preferred receptor of ordinary paper is preheated to 150°-160° C. to drive out moisture and render the paper less conductive so that it can retain a charge. A sheet resistivity of on the order of $10^{15}$ ohm/sq is mentioned. Development is accomplished at a development station comprising a trough containing a magnetic monocomponent toner and a magnetic brush roller. Toner is attracted from the brush roller to the ion image. The resulting toner image is fused.

In U.S. Pat. No. 4,463,363 to Gundlach et al, issued Jul. 31, 1984—A fluid jet assisted electrographic marking apparatus for ion projection printing is disclosed wherein ions are generated in a chamber, entrained in a rapidly moving fluid stream, modulated in an electroded exit zone and deposited in an imagewise pattern on a relatively movable charge receptor. A discussion of the prior art describes an ion projection system using a controlled ionized fluid stream for discharging precharged areas on a charge receiving surface. A large field of opposite polarity to the ionic species is maintained between an accelerating electrode and a ion projector housing to attract the ions to a receiving surface of a receptor sheet.

In U.S. Pat. No. 4,538,163 to Sheridon, issued Aug. 27, 1985—A fluid jet assisted ion projection printing apparatus is disclosed wherein substantially equal numbers of positive and negative ions are generated simultaneously during a series of RF breakdowns which take place within a fluid transport channel. A discussion of the prior art describes an ion projection system using a controlled ionized fluid stream for discharging precharged areas on a charge receiving surface. A charge receptor such as ordinary paper collects ions from the fluid stream in image configuration. The charge receptor overlies a biased conductive accelerating electrode plate. Oppositely charged marking particles are attracted to the ion patterns at a development zone.

In U.S. Pat. No. 4,524,371 to Sheridon et al, issued Jun. 18, 1985—A fluid jet assisted ion projection printing apparatus is disclosed having a housing including ion generation and ion modulation regions. The ions are deposited on a charge receptor on a backing electrode which may be connected to a high potential source of a sign opposite to that of the corona source.

In U.S. Pat. No. 4,644,373 to Sheridan et al, issued Feb. 17, 1987—A fluid assisted ion projection printing head is disclosed having a U-shaped cavity mated to a planar, conductive member which forms a closure for a major portion of the cavity opening and defines and ion generation chamber and a cavity exit region that is electrically conductive. Ions allowed to exit the printing head are deposited on a dielectric layer coated on an electrically conductive acceleration electrode. A high electric potential of a sign opposite the corona potential of the printing head is connected to the acceleration electrode.

In U.S. Pat. No. 4,584,592 to Tuuan et al, issued Apr. 22, 1986—A fluid jet assisted ion projection marking apparatus is disclosed including a marking head having integrally fabricated thereon, an array of modulating electrodes, address bus lines, data bus lines and thin film switches. A charge receptor collects ions from the fluid stream in image configuration. The charge receptor overlies a biased conductive accelerating back electrode. The charge receptor may be an insulating intermediate surface such as a dielectric drum.

In U.S. Pat. No. 4,410,584 to Toba et al, issued Oct. 18, 1983—An electrostatic recording member is disclosed comprising a recording layer, an electrically conductive layer and a support, wherein the electrically conductive layer is composed of micro-fine powder dispersed in an organic binder and has a surface resistivity of $10^6$ to $10^8$ ohms. The support may be of various shapes and various metallic or polymer materials. The recording layer is dielectric and has a volume resistivity of at least $10^{12}$ ohm.cm preferably at least $10^{14}$ ohm.cm. Dielectric materials such as organic dielectric substances such as polyesters, polycarbonates, polyamides, polyurethanes, (meth)acrylic-type resins, styrene-type resins, polypropylene, etc. or mixtures of inorganic powders, e.g. $TiO_2$, $Al_2O_3$, MgO, etc., and organic dielectric substances are disclosed. A recording layer thickness of at least 1 μm, and preferably up to 20 μm, especially 2 to 6 μm are disclosed. Electrostatic latent images are formed on the recording member by needle electrodes. The electrostatic latent image may be developed and the resulting developed image may be transferred to ordinary paper.

In U.S. Pat. No. 4,435,066 to Tarumi et al, issued Mar. 6, 1984—An electrostatic reproducing apparatus is disclosed in which the ion flow passing through an ion modulating member is increased by strengthening the electric field between the electrode of the ion modulating electrode and the reproducing member. A dielectric drum and a developing device are also disclosed as employed in the prior art.

In U.S. Pat. No. 4,491,855 to Fuji et al, issued Jan. 1, 1985—A method and apparatus are disclosed utilizing a controller having a plurality of openings or slit-like openings to control the passage of charged particles and to record a visible image by charged particles directly on an image receiving member. The charged particles are supported on a supporting member and an alternating field is applied between the supporting member and a control electrode. The image receiving member may, for example, be paper on an electrode.

In U.S. Pat. No. 4,474,850 to Burwasser, issued Oct. 2, 1984—An ink jet recording transparency is disclosed comprising a transparent resinous support having a 2-15 micrometer thick coating of a carboxylated, high molecular weight polymer or copolymer, or salts thereof, and optionally, a particulate pigment. Various specific pigments and substituents for the polymer are also disclosed.

In U.S. Pat. No. 4,481,244 to Haruta et al, issued Nov. 6, 1984—A material for writing or printing is disclosed comprising a substrate and a coating layer containing a polymer having both hydrophilic and hydrophobic segments. The coating may comprise various polymers prepared from monomers of, for example, styrene, acrylonitrile, vinyl acetate, vinyl chloride, acrylamide, vinylidene chloride, and many other specific materials. A porous inorganic powder, such as zeolites, silica and synthetic mica, may also be incorporated into the coating.

In U.S. Pat. No. 4,503,111 to Jaeger et al, issued Mar. 5, 1985—A recording material is disclosed comprising a hydrophobic substrate material with a polymeric coating. The polymeric coating may comprise a mixture of polyvinylpyrrolidone and a compatible matrix forming polymer. Specific coating thicknesses disclosed include 10.16 micrometers (0.40 mil) and 12.7 micrometers (0.5 mil). A final coating of at least 5 micrometers (0.005 mm) is also mentioned.

Thus, while systems utilizing the above-described known approaches may be suitable for their intended purposes, there continues to be a need for the development of an improved ionographic imaging system.

OBJECTS OF THE INVENTION

It is an object of this invention to provide a novel ionographic imaging system which overcomes the above-noted disadvantages.

It is another object of this invention to provide a thicker electroceptor capable of accepting high electrostatic potentials.

It is still another object of this invention to provide an electroceptor that allows lower flow rates of fluids through ionographic imaging heads thereby avoiding loud whistling noises from expensive blowers and pumps used to move the fluids.

It is another object of this invention to provide a system for creating high charge density or surface potential on an electroceptor surface.

It is still another object of this invention to provide a system for achieving high resolution images on an electroceptor surface.

It is another object of this invention to provide a system for forming strong fields for xerographic development with dry two-component developers.

It is still another object of this invention to provide a system for achieving a combination of both line and solid area images at the same time.

It is another object of this invention to provide a system for achieving higher charge density at higher electroceptor speeds.

It is still another object of this invention to provide a system that minimizes dielectric imaging layer wear.

It is still another object of this invention to provide a system that avoids production of undesirable fumes.

It is still another object of this invention to provide a system that utilizes a simple and inexpensive imaging member.

It is still another object of this invention to provide a system that utilizes a stable and durable imaging member.

It is still another object of this invention to provide a system that is reusable in a multi pass system without distortion.

It is still another object of this invention is to provide a higher latitude for the manufacture of the imaging member.

SUMMARY OF THE INVENTION

The foregoing objects and others are accomplished in accordance with this invention by providing an ionographic imaging member comprising a conductive layer and a uniform and continuous dielectric imaging layer-free of voids, the imaging layer having a dielectric constant of from about 1.5 to about 40 and a thickness of at least about 45 micrometers, the thickness divided by the dielectric constant having a value of from about 30 to about 60 micrometers.

Also included within the scope of this invention is an imaging process comprising providing an ionographic imaging member comprising a conductive layer and a dielectric imaging layer comprising a film forming polymer, the imaging layer having an imaging surface, a dielectric constant of from about 1.5 to about 40 and a thickness of at least about 45 micrometers, the thickness divided by the dielectric constant having a value of from about 30 to about 60; selectively directing a low current ion stream on the imaging surface to form an electrostatic latent image on the imaging surface; and contacting the imaging surface with electrostatically attractable marking particles whereby the marking particles deposit on the imaging surface in image configuration. The deposited marking particles may be transferred to a receiving member and the imaging surface may thereafter be cleaned and cycled through additional latent image forming, marking particle contact, marking particle transfer and cleaning steps.

BRIEF DESCRIPTION OF THE DRAWINGS

Other objects and further features and advantages of this invention will be apparent from the following description considered with the accompanying drawings, wherein.

Figure 1:
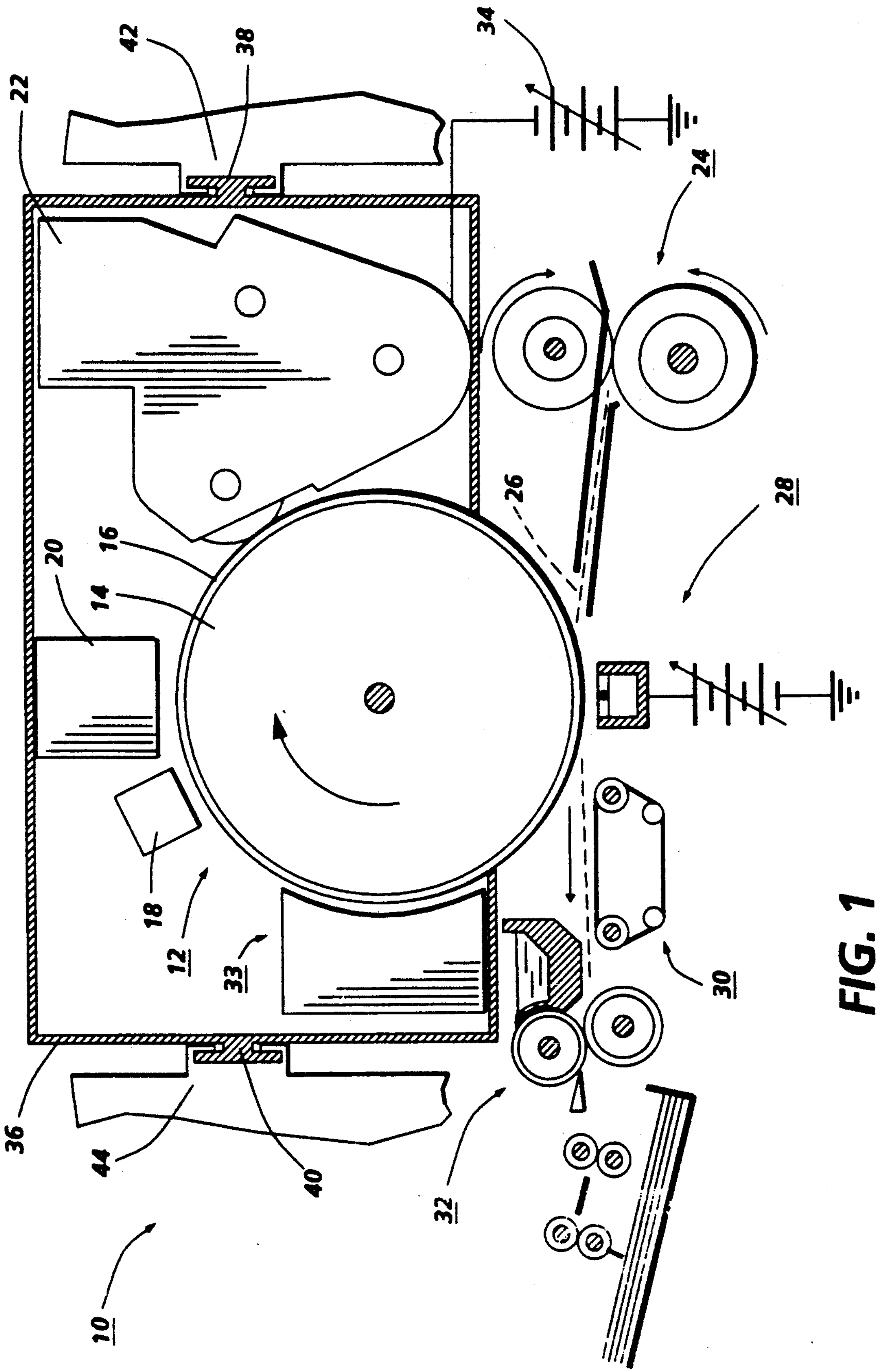
FIG. 1 is a partial sectional elevation view showing a printing apparatus utilizing a fluid assisted ion projection printing head.

With particular reference to the drawings, there is illustrated in FIG. 1 a printing system 10 comprising an electrographic imaging member 12 comprising an electrically conductive drum 14 bearing a dielectric imaging layer 16. Arranged around the outer periphery of electrographic imaging member 12 is a charging station 18 for applying a uniform electrostatic charge to dielectric imaging layer 16; a fluid flow assisted ion projection printing head 20 (e.g. of the type described in U.S. Pat. Nos. 4,463,363, 4,524,371 or 4,644,373) for selectively discharging the uniformly charged dielectric imaging layer 16 to form an electrostatic latent image; a development station 22 (e.g. a magnetic brush applicator) for contacting the electrostatic latent image with two-component developer to form a toner image in conformance with the electrostatic latent image; a sheet feeding station 24 to feed receiving sheets (shown as a dashed line 26) to dielectric imaging layer 16; a transfer station 28 to transfer the toner image to receiving sheets 26; a sheet transport station 30 to transport receiving sheets 26 bearing the transferred toner image to a fusing station 32 for fixing the toner image to receiving sheets 26; and cleaning station 33 for removing any residual toner remaining on the imaging layer 16. An adjustable biasing power supply 34 connected to development station 22 permits changes to image development conditions relative to the latent image potential. By introducing a reverse bias, of the same polarity as the ions forming the latent image, and applying the bias between the conductive drum 14 and the development station 22, nonuniformities in the non-image areas of the latent image can be kept more free of unwanted toner particles. Except for an opening at the bottom, cassette housing 36 surrounds and supports electrographic imaging member 12, charging station 18, printing head 20, development station 22, and cleaning station 33. The bottom of cassette housing 36 is open to allow imaging layer 16 to contact receiving sheets. Rails 38 and 40 are secured to the sides of and support cassette housing 36 and are adapted to be slideably mounted in horizontal tracks 42 and 44, respectively, which are, in turn, secured to frame members of the printing device. A suitable latching means (not shown) temporarily retains the cassette in place relative to the path of the receiving sheets. This arrangement facilitates rapid replacement of the major components of the electrographic printing engine. If desired, one or more of the processing stations may be positioned outside of cassette housing 36 and mounted to the frame members of the printing device because replacement is unnecessary at the time the electrographic imaging member 12 is replaced. The entire disclosures of U.S. Pat. No. 4,463,363, 4,524,371 and 4,644,373 are incorporated herein by reference.

Figure 2:
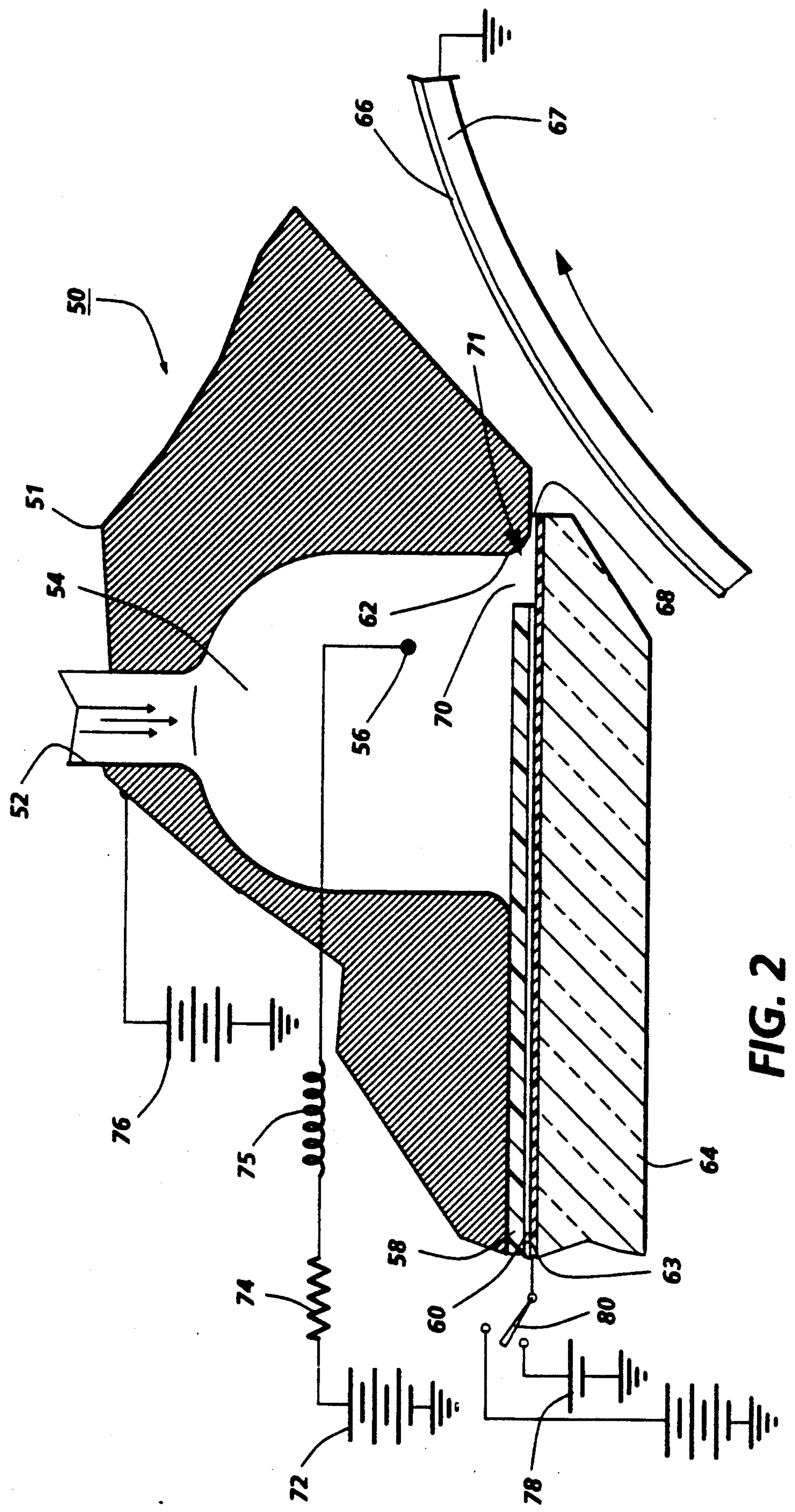
FIG. 2 is a sectional elevation view showing details of the ion projection printing head.

Referring to FIG. 2, there is illustrated, by way of example, an ion projection head 50 comprising an upper casting 51 of electrically conductive material. Upper casting 51 is cast of stainless steel but it should be understood that any other suitable conductive material will be satisfactory, as long as it will not be affected by extended exposure to the chemistry of the corona discharge. Upper casting 51 of projection head 50 is connected to a plenum chamber (not shown) to which is secured a source of fluid (not shown). An entrance channel 52 receives low pressure fluid (preferably air) from the plenum chamber and delivers it to ion generation cavity 54. The entrance channel 52 should have a large enough cross-sectional area to ensure that the pressure drop therethrough will be small. Cavity 54 has a generally U-shaped cross section; with its three sides surrounding a corona wire 56. Suitable wire mounting supports (not shown) are provided at opposite ends of the cavity 54 for mounting wire 56 at a predetermined location within the cavity. By mounting the wire ends on eccentric supports (not shown), relative to the housing of projection head 50, some limited adjustment of the wire location is made possible. It should be apparent that although an ion projection head 50 of this construction is illustrated, other suitable ion projection head configurations may be substituted for the head illustrated. A conductive plate 58, insulating layer 60, and thin film element layer 63 are supported on a planar substrate 64, typically about 1,016 micrometers (40 mils) thick. A pair of extensions on each side of planar substrate 64 form wiping shoes (not shown) which ride upon the outboard edges of the dielectric image layer 66 supported on electrically grounded metal drum 67 so that the proper spacing is established between ion projection head 50 and the imaging surface of dielectric image layer 66.

When properly positioned on upper casting 51 of ion projection head 50, by means of suitable locating lugs (not shown), conductive plate 58 and planar substrate 64 are each cantilever mounted so that they define, in conjunction with upper casting 51, an exit channel 68 including the cavity exit region 70 [about 250 micrometers (10 mils) long] and an ion modulation region 71 [about 508 micrometers (20 mils) long]. Conductive plate 58, typically about 305 micrometers (12 mils) thick, closes the major portion of U-shaped cavity 54, forming an ion generation chamber within cavity 54 and leaving cavity exit region 70 between the end of conductive plate 58 and adjacent cavity wall 62. Preferably planar substrate 64 is a large area marking chip comprising a glass plate upon which are integrally fabricated thin film modulating electrodes, conductive traces and transistors. This large area chip is fully described in U.S. Pat. No. 4,584,592 to Hsing C. Tuan et al., the entire disclosure thereof being incorporated herein by reference. All the thin film elements are represented by thin film element layer 63. Insulating layer 60 overcoats thin film element layer 63 to electrically isolate it from the conductive plate 58.

Placement of corona wire 56 is preferably about the same distance from cavity wall 62 and from conductive plate 58, and closer to these chamber walls than to the remaining cavity walls. Such an orientation will yield higher corona output currents than with other cylindrical ion generation chamber of comparable size. The width across the cavity 54 is about 3175 micrometers (125 mils) but corona wire 56 is spaced only about 635 micrometers (25 mils) from each of the cavity walls 62 (i.e., less than half the distance between the wire and the walls of a conventional cylindrical chamber). It should be understood that it would be possible to fabricate upper casting 51 of an insulating material, as long as the cavity wall 62 is made conductive and is suitably connected to a reference potential (such as ground). If upper casting 51 is made insulating, the ion flow to the remote cavity walls will accumulate thereon. However, by spacing corona wire 56 much closer to the conductive walls than to the insualting walls, relatively few ions will flow to the insulating walls, charge build-up is minimized, and arcing to those walls is prevented.

Air flow enters ion projection head 50 through entrance channel 52, flows through cavity 54 (ion generation chamber) and out of the ion generation chamber through exit channel 68. In order to ionize the air (or other ionizable fluid) around corona wire 56 for generating a uniform corona around each linear increment of the wire in the space between the wire and cavity walls 62, well known technology is applied. For example, a high potential source 72 (on the order of about several thousand volts) may be applied to corona wire 56 through a suitable resistance element 74 (typically one megohm) and through an inductive element 75 (typically 2700 microhenries and placed as close as possible to the ion projection head) used to prevent radiative coupling from the corona wire to other system electronics during startup and a reference potential 76 (on the order of about a thousand volts or, alternatively, electrical ground) may be applied to cavity wall 62. Some of the ions, thus generated, will be attracted to cavity wall 62 where they will recombine into uncharged air molecules. Once the remainder of the ions have been swept into the exit channel 68 with the air flow, it becomes necessary to render the escaping ion laden airstream intelligible. This is accomplished in ion modulation region 71 by individually switchable modulation electrodes (not shown) in thin film element layer 63, each connected to a low voltage source 78 (on the order of about thirty volts) through a switch 80. In actual construction, the modulation electronics driving the individually switchable modulation electrodes in thin film element layer 63 may comprise standard multiplex circuitry whereby groups of electrodes are ganged and suitable backing electrodes are present on the opposite wall 62 or, alternatively each electrode may be individually driven by a known, series in/parallel out, shift register. Each electrode controls a narrow "beam" of ions in the curtain-like air stream that exits from ion modulation region 71. For example, in an array of 200 control electrodes per inch, the conductive electrodes could be about 89 micrometers (3.5 mils) wide each separated from the next by 38 micrometers (1.5 mils). It is expected that more compact arrays, having narrower electrodes and narrower insulating barriers, is well within the realm of the possible. Optimally, the distance between the thin film element layer 63 and cavity wall 62 at the closest point is between about 76 micrometers (3 mils) and about 127 micrometers (5 mils) from the standpoint of resolution and power consumption requirements. For the channel widths of this magnitude, laminar flow conditions will prevail with the air velocities of interest, e.g. about $1\times10^4$ cm/sec. The ions allowed to exit from ion modulation region 68 come under the influence of electrically grounded metal drum 67 which functions as an acceleration electrode that attracts the ions in order that they may be deposited upon the surface of dielectric imaging layer 66. A high potential electrical source (not shown) on the order of several thousand volts DC, of a sign opposite to that of the ions exiting from the ion projection head, may be applied to metal drum 67 in lieu of grounding. Alternatively, the surface of the dielectric imaging layer 66 may be charged by charging station 18 (see FIG. 1) to a high electric potential (on the order of a thousand volts) opposite in sign to that of the ions from the ion projection head. One benefit of precharging the receiver to a high potential of either sign is to avoid problems associated with lower potentials being created on the receiver surface by triboelectrification against components such as the cleaning blade and developer which are in contact with the surface of the electroreceptor. Triboelectric charging levels on the dielectric imaging layer 66 may reach levels 600 V above ground in either polarity depending on the receiver thickness and on the materials chosen for the contacting subsystems. By choosing the precharge level higher than the highest triboelectric charge level, all image areas and triboelectric charged areas will be precharged to a uniform level by the precharging device.

The conductive layer underlying the dielectric imaging layer may be an electrically conductive supporting substrate or an electrically conductive layer on a supporting substrate. In the latter embodiment, the supporting substrate may be either electrically insulating or electrically conductive. The conductive layer as a supporting substrate or as an electrically conductive layer on a supporting substrate may be in any suitable form including a web, foil, laminate or the like, strip, sheet, coil, cylinder, drum, endless belt, circular disc or other suitable shape. Any suitable electrically conductive material may be employed in the conductive layer. The conductive layer may be, for example, a thin vacuum deposited metal or metal oxide coating, a metal foil, electrically conductive particles dispersed in a binder and the like, or gasses which produce conductive coatings when plasma deposited. Typical metals and metal oxides include aluminum, indium, gold, tin oxide, indium tin oxide, silver, nickel, and the like. Typical electrically conductive supporting substrates include metal tubes, metalized polymers such as polyesters and other polymeric and cellulosic materials, films coated with opaque or transparent conductive polymers or the like. Typical insulating supporting substrates include organic and inorganic polymers, ceramics, cellulosic materials, salts, and blends.

Any suitable adhesive material may be employed in the optional adhesive layer of the ionographic imaging member of this invention. The optional adhesive layer may be substantially electrically insulating, or have any other suitable properties. Typical adhesive materials include polyesters (e.g. Vitel PE-100 and PE-200, available from Goodyear Chemicals Division of the Goodyear Tire and Rubber Company and DuPont 4900, available from E. I. du Pont de Nemours & Co.); styrene copolymers (e.g. various Pliolite polymers available from Goodyear Chemicals Division of the Goodyear Tire and Rubber Company); Versalan 1138 and Macromelt 6238, available from Henkel Corp.; acrylic polymers (e.g. DuPont 68070 and 68080 acrylic adhesives, available from E. I. du Pont de Nemours & Co.); polyurethane resins (e.g. Estane 5707, 5715, available from B. F. Goodrich Chemical Company, Division of B. F. Goodrich Co.) and the like and mixtures thereof. Where the adhesive layer is electrically insulating, it is preferably continuous and has a thickness up to about 10 micrometers, although thicker adhesive layers may be suitable and desirable in some embodiments. Where the adhesive is not conductive, the dielectric thickness of the adhesive layer should be added to the dielectric thickness of the imaging layer. If the adhesive layer is electrically conductive, there are virtually no limitations on thickness, except for the practical ones of handling and economics. Adhesive layers of between about 0.5 micrometer and about 2.0 micrometers are preferred for more uniform coatings of dielectric imaging layer material when applied by spray coating.

The dielectric imaging layer of this invention comprises a material capable of forming an integral, uniform and continuous layer free of voids and may comprise a film forming polymer, inorganic materials or mixtures thereof with or without other additives. The dielectric imaging layer as a whole should have a dielectric constant of from about 1.5 to about 40 and a thickness of at least about 45 micrometers, the thickness divided by the dielectric constant having a value of from about 30 to about 60. It has been found that some electroreceptors having these properties have produced images with at least about 600 spots/inch resolution and at least about 0.8 image density in ionographic imaging systems utilizing fluid jet assisted ion projection heads and two component developers containing insulating carrier particles as well as single component and liquid development systems. The dielectric imaging layer may be made from any suitable organic or inorganic material. The dielectric imaging layer may be homogeneous or heterogeneous. Typical homogeneous layers include organic film forming polymers having a dielectric constant of between about 1.5 to about 40 such as those listed in Table I below.

TABLE I

| Dielectric Constant (@ $10^6$ cps. or Hz) | DIELECTRIC IMAGING LAYER POLYMERS |
|---|---|
| 4 to 6 | Polyurethane |
| 3 to 4.5 | Polyesters |
| 2 to 3 | Polytetrafluoroethylene and other fluorocarbon polymers |
| 2.8 to 3.2 | Polycarbonate |
| 3.1 to 3.7 | Polyarylether |
| 3.1 | Polysulfone |
| 2.5 to 3.4 | Polybutadiene and Copolymers with Styrene, vinyl/toluene, acrylates |
| 3.5 | Polyethersulfone |
| 2.2 to 2.6 | Polyethylene and Polypropylene |
| 3.5 | Polyimide |
| 4.0 | Poly(amide-imide) |
| 3.1 | Polyetherimide |
| 2.12 | Polyethylpentene |
| 3.2 | Polyphenylene Sulfide |
| 2.5 to 3.4 | Polystyrene and Acrylonitrile Copolymers |
| 3.3-4.5 | Polyvinylchloride and Polyvinyl acetate copolymers and terpolymers |
| 2.6 to 3.3 | Silicones |
| 2.1 to 3.5 | Acrylics and Copolymers |
| 2.8 to 4.1 | Alkyd |
| 3.0-5.0 | Amino |

TABLE I-continued

| Dielectric Constant (@ $10^6$ cps. or Hz) | DIELECTRIC IMAGING LAYER POLYMERS |
|---|---|
| 2.8 to 4.0 | Cellulosic resins and polymers |
| 3.3 to 4.0 | Epoxy resins and esters |
| 3.3 to 4.5 | Nylon and Other polyamides |
| 4.5 to 5.0 | Phenolic |
| 2.6 to 3.0 | Phenylene oxide |
| 6.4 to 10.0 | Polyvinylidene fluoride |
| 7.0 to 9.0 | Polyvinyl fluoride |
| 3.8 | Phenoxy |
| 3.7 | Polyaryl Sulfone |

Typical organic film forming polymers include, for example, polycarbonate co-polyesters (e.g. XP73036.00 and XP73038.00, available from Dow Chemical Co.), polyethylene terephthalate, co-poly(1,4-cyclohexylenedimethylene/ethylene) terephthalate, polysulfone and the like. Of special interest are the various urethanes, epoxies, acrylates, and silane materials which could be deposited as monomeric coatings and cured on the conductive layer by UV, e-beam or heat to form tough abrasion resistant polymeric coatings. Polymeric dielectric imaging layer materials such as polyurethane (Imron enamel available from E. I. du Pont de Nemours and Co.) polycarbonate (e.g. Makralon 5745, available from BASF Corp.), polycarbonate co-esters (e.g. XP73010.00, available from Dow Chemical Co. Corp.), polysulfone, copoly (1,4-cyclohexylene-dimethylene/ethylene) terephthalate (PETG co-polyester 6763, available from Eastman Kodak Co.), polyvinyl fluoride, polyvinylidene fluoride, perfluoroalkoxy tetrafluoroethylene, and in mixtures thereof are particularly preferred because they readily accept charge, exhibit low charge decay, good humidity stability, and are easy to clean. The dielectric imaging layer may comprise a blend of a film forming polymer and an adhesive such as the adhesive materials described above with reference to the optional adhesive layer. For example, excellent results have been achieved with blends of 80 percent by weight polycarbonate (Lexan 4701, available from General Electric Co.) with 20 percent by weight polyester (Vitel PE-100, available from Goodyear Tire and Rubber Co.) or 20 percent by weight polyester (Vitel PE-200, available from Goodyear Tire and Rubber Co.). These blends adhere particularly well to metallic surfaces and eliminate the need for a special adhesive layer.

If desired, any suitable inorganic material may be employed in a homogeneous dielectric imaging layer. Typical inorganic materials include ceramics, aluminum oxide, titanium dioxide, zinc oxide, barium oxide, glasses, magnesium oxide and the like.

The dielectric imaging layer may also contain any suitable dissolved or dispersed materials. These dissolved or dispersed materials may include, for example, inorganic materials such as barium titanate, transition metal oxides of iron, titanium, vanadium, manganese, or nickel, phosphate glass particles and the like. One specific class of dispersed materials is obtained from the transition metal oxides by making use of their property of multiple valency. Transition metal phosphate glasses may be obtained by mixing and subsequently melting sufficient quantities of the transition metal oxides with phosphorous pentoxide. This process creates a glass with predetermined dielectric properties in which a desired composite material dielectric constant can be obtained in a predictable manner. One example of such a glass is 4.5 $TiO_{2-x}.2P_2O_5$, where 'x' determines the ratio of the two valence states of the Ti— the larger the 'x' the more $Ti^{3+}$ ion is present. The ratio of $Ti^{3+}$ to $Ti^{4+}$ determines the dielectric properties of the glass. Thus, the smaller the value of 'x', the smaller the value of the DC dielectric constant. Such a glass may be produced by first obtaining an appropriate $TiO_2$—$P_2O_5$ mixture by heating a calculated mix of powdered $TiO_2$ and $(NH_4)_2HPO_4$ in an argon atmosphere. This mixture is doped as required with $Ti_2O_3$. After thorough mixing, the resultant powder is heated in an argon atmosphere until it melts. It is maintained in a molten state for a period of about 1 hour and then cast by pouring directly from the melt. Alternatively, the glass may be shotted by conventional means. A value of $x=0.05$ yields a static dielectric constant of about 20 and a high frequency dielectric constant of about 6. Values in this range are easily achieved with all the transition metal oxides; values as high as 100 can be obtained for the static dielectric constant. Once formed, the glass is ground or otherwise processed into fine particles for combination in the manner described herein to create the electroceptor of a desired dielectric constant. In preparing the transition metal phosphate glasses other transition metals such as V, Mn, Ni, Fe and the like may be substituted for Ti in the above formula. The values in front of the oxide and the pentoxide may also be varied. Thus, with the pentoxide value fixed, the other value may be varied from 2.5 to 6 to still achieve a glass. These materials are humidity insensitive, tough, vary in transparency from clear at $x=0$ to smoky for $x=0.1$, and are nontoxic in that they are inert in this form. Alternatively, or in addition to the inorganic materials, organic materials maybe dissolved or dispersed in the electroceptor layer. Typical organic materials include charge transport molecules, waxes, stearates, light and thermal stabilizers, dyes, antioxidants, plasticizers, and the like and mixtures thereof. Preferably, the dielectric imaging layer contains from about 20 percent by weight to about 100 percent by weight film forming polymer and from about 0 percent by weight to about 80 percent by weight of dispersed material, based on the total weight of the dielectric imaging layer. Typical heterogeneous layers include organic polymers containing dissolved or dispersed materials such as barium titanate dispersed in polypropylene, or transition metal (Fe, Ti, V, Mn, Ni) oxide or phosphate glass particles dispersed in a polymer such as polycarbonate, polyester, polyethylene, polysulfone, polyvinyl, polyurethane, nylon, and the like. The dielectric imaging layer may also contain various compounds dissolved or dispersed throughout which could aid in improving electrical charge retention such as various charge transport molecules. Also, for example, additives could be employed to increase or decrease the dielectric constant of the dielectric imaging layer. By selection of suitable dielectric imaging layer materials, the electroceptor surface may be utilized for triboelectric charging of toner or developers. Moreover, release agents may be incorporated in the imaging layer to promote toner transfer or removal, e.g. zinc stearate may be added for cleaning. Further, powder fillers may be added to increase compressive strength for transfix properties.

It should also be appreciated that a host of other dielectric materials are listed in the Handbook of Chemistry and Physics, 66th Ed. 1985-1986, CRC Press, Inc., Section E, pages 49-59 and elsewhere which are potentially useful in dielectric imaging layers (electroceptors), and their selection is obvious once the desired conditions stated above are recognized.

If desired, the dielectric imaging layer may comprise multiple layers of the same or different dielectric materials. Generally, the composite of the multiple layers, as a whole, should have a dielectric constant of from about 1.5 to about 40 and a thickness of at least about 45 micrometers, the thickness divided by the dielectric constant having a value of from about 30 to about 60. The uppermost layer may have different properties than the underlying layers. For example, a Teflon upper layer having a thickness of about 2 micrometers may be selected for its low dielectric constant property, its excellent stability to wear resistance, and its low surface energy characteristics for improved transfer and cleaning processes. The underlying dielectric layer could be another dielectric material such as a polyimide (Kapton type F, available from E. I. Du Pont de Nemours & Co.) having thickness of about 43 to 75 micrometers and a dielectric constant of 3.7.

The thickness of the deposited dielectric imaging layer or layers after any drying or curing step is preferably at least about 75 micrometers to obtain high resolution and image density. When the dry thickness of the dielectric imaging layer is less than about 45 micrometers, the image density from a given ion projection head and two component development system is low, although resolution is acceptable. Optimum results are achieved with a total dielectric imaging layer thickness of between about 75 micrometers and about 400 micrometers.

The dielectric imaging layer and/or the optional adhesive layer may be applied to an underlying layer by any suitable coating process. Typical coating processes include conventional draw bar, air assisted, atomized, or rotary spraying, extrusion, dip, gravure roll, wire wound rod, air knife coating, sputtering, powder coating, and the like.

If desired, any suitable solvent may be employed with the film forming polymer material to facilitate application of the dielectric imaging layer to the electrically conductive layer or to the optional adhesive layer. For those materials which form films during the coating process, the solvent should dissolve the film forming polymer. Typical combinations of film forming polymer materials and solvents or combinations of solvents include polycarbonate (e.g. Lexan 4701 available from General Electric Co.) and dichloromethane/1,1,2-trichloroethane; polycarbonate (e.g. Makrolon 5705, available from BASF Corp.) and 1,12 trichloroethane; polysulfone (e.g. P-3500, available from Union Carbide Corp.), methylene chloride and 1,1,2 trichloroethane; Merlon M-39 (available from Mobay Chemical Co.), dichloromethane, 1,1,2 trichloroethane, Lexan 145 (available from General Electric Co.) and 1,1,2 trichloroethane; Lexan 3250 (available from General Electric Co.), dichloromethane and 1,1,2 trichloroethane; Dow XP73038 (available from Dow Chemical Co.), dichloroethane and 1,1,2 trichloroethane; XP 73010.0 (available from Dow Chemical Co.) and 1,1,2 trichloroethane; Lexan 145 (available from General Electric Co.), dichloroethane and 1,1,2 trichloroethane; and Dow Polycarbonate Copolymer XP73036.00 (available from Dow Chemical Co.), dichloromethane and 1,1,2 trichloroethane and the like. Coatings applied from solutions may be solidified by any suitable technique to dry or cure the coating. Typical drying techniques include oven drying, infra-red lamp drying, vacuum chamber drying, and the like. Drying is preferably conducted at a rate which minimizes the formation of bubbles and stress in the coating. For example, programmed heating rates conducted with incremental increases in temperature for predetermined periods of time may be utilized to form layers substantially free of bubbles, stress cracks and other voids. Polymers may also be held in suspension, emulsion, or dispersion during the coating process and later formed into films during drying, coalescence, or curing processes in which latent solvents are employed.

It is generally desired to achieve between about 75 and about 600 volts for good development of the latent image on a dielectric imaging layer utilizing electrophoretic, conductive magnetic brush, or single component development and between about 250 and about 1000 volts for good development of the latent image on a dielectric imaging layer utilizing two component development with insulating carriers.

The dielectric constant of the dielectric imaging layer affects the blooming factor. Charge spreading occurs when the incoming ions are repelled by the field emanating from the receptor towards the ion head created by ions already deposited on the receptor. Field strength in the region above the electroreceptor is determined by the ratio of the dielectric thickness of the region between the ion projection head and the receptor and the dielectric thickness of the receptor. For the same thickness of receiver, the lower dielectric constant causes more spreading. Generally, satisfactory results may be achieved with dielectric imaging layers having a dielectric constant between about 1.5 and about 40 with thicknesses of at least 45 microns which give dielectric thicknesses of between 30 and 60 microns. The lower boundry of 1.5 for dielectric constant is currently a material availability boundry. Coating uniformity for the thin layers needed to utilize low dielectric constant materials becomes more difficult to achieve because of a tighter requirement on absolute thickness. Voids such as pinholes and other coating defects are also more problematic for thinner coatings. The upper limit of about 40 on the dielectric constant of a film forming polymer is determined by the effects of the dopant used to raise the dielectric constant. The mechanical integrity of the layer is adversely affected by the addition of bulk dopants and adhesive properties of the polymer to the dopant and of the mixture to the substrate. Some high dielectric constant materials are very sensitive to factors such as charge trapping and charge injection. These factors are difficult to control in high dielectric constant materials created by bulk doping of polymers. Moreover, the interface with the substrate becomes more sensitive to charge injection creating the possible need for charge blocking layers. In addition, high dielectric constant materials require greater thicknesses which increase cost and manufacturing difficulty. A dielectric constant of between about 2 and about 12 is preferred. Optimum results are achieved with a dielectric constant of between about 2 and about 8.

The dielectric imaging layer should also have a bulk resistivity of at least about $10^{10}$ ohm cm at between about 5 percent to about 80 percent relative humidity and between about 16° C. (60° F.) and about 50° C. (122° F.) because charge movement on the surface of the imaging layer after imagewise discharge results in image blooming. Bulk resistivity below this level also causes charge decay through the dielectric imaging layer decreasing the available image charge level for development.

In regard to thickness of the dielectric imaging layer, thinner dielectric imaging layers can accept charge without excessive spreading, but are more adversely affected by pin holes, impurities and the like. Moreover, less voltage can be impressed on it so that adequate development with two component magnetic brush development with insulating carrier particles is not possible. Also, the uniformity of coating and the tolerances of the substrate surface become more critical with thinner dielectric imaging layers. For example, a 0.25 micrometer thickness variation in a thick 203 micrometer (8 mil) dielectric imaging layer presents less variation of uniformity than a 0.25 micrometer thickness variation in a thin 25 micrometer (1 mil) dielectric imaging layer. A satisfactory lower thickness limit is about 45 micrometers with a dielectric constant of 1.5 because variation in thicknesses of less than about 5% can be achieved by conventional coating techniques and films without pinholes and other coating defects can be cost effectively produced. A preferred thickness is about 76 micrometers (3 mils) for a dielectric constant of 2 to about 360 micrometers for a dielectric constant of 12 and an optimum at lower dielectric imaging layer thicknesses is about 127 micrometers (5 mils) where the dielectric constant of the dielectric imaging layer is about 3. For a dielectric imaging layer having a dielectric constant of about 7, the lower thickness limit is about 210 micrometers (8.3 mils). The satisfactory upper limit is about 2400 micrometers for materials having a dielectric constants of about 40.

The thickness divided by the dielectric constant should be between about 30 and about 60 with optimum being about 35 to 54. For materials having a thickness approaching the upper limit of 2400 micrometers, costs become considerable because the dielectric constant has to be raised with special compounds such as barium titanate. The use of additives can affect batch to batch uniformity of the dielectric imaging layer. For example, a small percentage change in additive content can cause a much greater percentage change in dielectric constant beyond 30 percent loading, because the dielectric constant is a superlinear function of loading.

As previously described, a preferred imaging process of this invention comprises providing an ionographic imaging member comprising a conductive layer and a dielectric imaging layer comprising a film forming polymer, the imaging layer having an imaging surface, a dielectric constant of from about 1.5 to about 40 and a thickness of at least about 45 micrometers, the thickness divided by the dielectric constant having a value of from about 30 to about 60; uniformly depositing on the imaging surface an electrostatic charge of a first polarity, directing a stream of ions of a polarity opposite the charge of a first polarity from a head electrically biased to the same polarity as the ions to discharge in image configuration the uniformly deposited charge of a first polarity thereby forming an electrostatic latent image on the imaging surface, and depositing electrostatically attractable marking particles on the imaging surface in conformance with the electrostatic latent image while simultaneously applying an electrical bias of the first polarity across the thickness of the dielectric layer and marking particle developer system.

Generally, the uniform charging of the ionographic imaging member is accomplished to achieve a potential between the ion projection head and the conductive layer of the ionographic imaging member of between about 1000 volts and about 4000 volts. The uniform charge on the dielectric member may account for between 5 percent and 100 percent of the potential. The dielectric imaging member may be uniformly charged by any suitable means. A typical charging means is a conventional corona charging element extensively utilized in xerographic imaging systems. Generally, satisfactory results may be achieved by uniformly charging the dielectric imaging layer to between about −50 volts and about −2000 volts. When the dielectric imaging layer is charged to less than about −50 volts, the charging systems are less able to provide a uniform charge level or to effectively erase the previous imagewise charge pattern. If the dielectric imaging layer is charged to more than about 100 volts per micrometer of thickness or exceeds its dielectric strength electrical breakdown may occur. If the voltage difference between the head and receptor exceeds the Paschen limit for the spacing between them, electrical breakdown can also occur.

Imagewise discharging of the uniformly charged imaging surface starting at a satisfactory level of about −1500 V with an ion stream should reduce the charge potential on the imaging surface to between about −1425 volts and about −500 volts to form an electrostatic latent image on the imaging surface having a difference in potential between background areas and image areas of between about 75 volts and about 1000 volts. Selection of surface potential depends on the biasing of suitable developer subsystems, with about 75 to about 600 volts for good development of the latent image on a dielectric imaging layer utilizing electrophoretic, conductive magnetic brush, or single component development and with about 250 to about 1000 volts for good development of the latent image on a dielectric imaging layer utilizing two component development with insulating carriers. Any suitable non-fluid assisted or fluid assisted ion projection printing head may be utilized to imagewise discharge the uniformly charged dielectric imaging layer. Ion projection printing heads are well known in the art. Typical non-fluid assisted ion projection printing heads are described, for example, in U.S. Pat. Nos. 3,976,484, 4,143,965, 4,137,537, 4,168,974, and 4,494,129, the entire disclosures of these patents being incorporated herein by reference. Typical fluid assisted ion projection printing heads are described, for example, in U.S. Pat. Nos. 4,644,373 to N. Sheridon and G. Sander, 4,463,363 to R. Gundlach and R. Bergen and 4,524,371 to N. Sheridon and M. Berkovitz, the entire disclosures of these patents being incorporated herein by reference. Fluid assisted ion projection printing heads are preferred because they do not come into physical contact with the electroreceptor which can cause wear and damage as stylus systems can. Further, fluid assisted ion projection is more efficient and can produce higher resolution images because non fluid assisted systems utilize screens or apertures which restrict ion flow to certain regions of the receptor. As previously described, in a typical fluid assisted ion projection printing head, pressurized air is moved through an ion generation chamber for entraining ions generated in the ion generation chamber and for transporting them through an exit channel or slit including an ion modulation region for subsequent deposition upon the uniformly charged dielectric imaging layer. Generally, the pressurized air is under a pressure of between about 1 inch of water and about 10 inches of water, and preferably between about 3.5 to about 7 inches of water prior to introduction into the ion generation chamber. A corona wire is mounted in the ion generation chamber and high electrical fields are established between the mounted corona wire, maintained at from about 2000 volts to about 6000 volts DC, and the conductive walls of the ion generation chamber. Because the voltage on the corona wire needed to maintain the corona is dependent on the spacing and geometry of the wire and the ion generation chamber, the preferred embodiment is to maintain this voltage by applying a constant current source of about from 0.8 to 2.0 miliamps to the wire. A bias potential of from 0 volts to about 1500 volts DC may be applied to the conductive walls of the ion generation chamber, the polarity of the reference voltage being the same as that of the polarity of the potential applied to the corona wire. As the ions are swept into the exit slit the ion stream is modulated by individually switchable modulation electrodes in thin film element layer, each connected to a voltage source of from about 10 volts to about 400 volts DC, the polarity of the applied potential being chosen to deflect the ions toward or away from the modulation electrodes. The distance between the thin film element layer and cavity wall at the closest point is between about 76 micrometers (3 mils) and about 203 micrometers (8 mils) to provide satisfactory resolution at a reasonable rate of power consumption. Since image resolution depends upon the spots per inch of charge projected to the receiver to produce the electrostatic latent image, the ion streams should be controlled and modulated to less than the spot width. For example, 2700 volts is employed for a 635 micrometer (0.025 inch) exit slit gap to prevent charge spreading as ions traverse the space between the fluid assisted ion projection printing head and the receiver surface. For the channel widths of this magnitude, laminar flow conditions will prevail with the air velocities between about 0.3 CFM and about 3 CFM and preferably between about 1 CFM to about 2.1 CFM. A high potential electrical source between about 0 volts to about 1500 volts DC of a sign opposite to that of the corona potential may be applied to metal layer underlying the dielectric imaging layer. Generally, the fluid assisted ion projection printing head should be spaced from about 150 micrometers and about 1500 micrometers from the imaging surface of the dielectric imaging layer. If the head is too close to the imaging surface, Paschen breakdown occurs and the imaging surface discharges. Although one polarity of charging and discharging has been described here, this invention may equally well be used with all polarities reversed, and/or with development systems utilizing charged or discharged area development with well known choices of development bias and materials.

The electrostatic latent image is then developed with electrostatically attractable marking particles to form a marking particle image corresponding to the electrostatic latent image. The developing (toning) step may be identical to that conventionally used in xerographic imaging. The electrostatically attractable marking particles may be applied, for example, to the electrostatic latent image on a receiver precharged to about −1500 V and imaged to about −650 V with a developer applicator while supplying a bias potential to the developer applicator of between about −1450 volts and about −1300 volts whereby the marking particles deposit on the imaging surface in image configuration to form a marking particle image. Generally, the minimum surface voltage of the image to be developed should be at least about 250 volts when insulating two-component developers are employed and about 75 volts when conductive two-component developers or when single component development systems are used. Conductive single or two-component developers as mentioned here are systems which tend to develop until the electric field above the toned latent image is neutralized while insulating two-component developers systems tend to develop less than 50 percent of the electric field above the latent image.

Any suitable conventional xerographic dry or liquid developer containing electrostatically attractable marking particles may be employed to develop the electrostatic latent image on the electroreceptor of this invention. This invention is particularly effective for development with suitable dry two-component developers containing electrically insulating carrier particles. Two-component developers comprise marking (toner) particles and carrier particles. Typical toner particles may be of any composition suitable for development of electrostatic latent images, such as those comprising a resin and a colorant. Typical toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl indole and N-vinyl pyrrolidene; styrene butadienes; mixtures of these monomers; and the like. The resins are generally present in an amount of from about 30 to about 99 percent by weight of the toner composition, although they may be present in greater or lesser amounts, provided that the objectives of the invention are achieved.

Any suitable pigment or dyes may be employed in the toner particles. Typical pigments or dyes include carbon black, nigrosine dye, aniline blue, magnetites, and mixtures thereof, with carbon black being the preferred colorant. The pigment is preferably present in an amount sufficient to render the toner composition highly colored to permit the formation of a clearly visible image on a recording member. Generally, the pigment particles are present in amounts of from about 1 percent by weight to about 20 percent by weight based on the total weight of the toner composition; however, lesser or greater amounts of pigment particles may be present provided that the objectives of the present invention are achieved.

Other colored toner pigments include red, green, blue, brown, magenta, cyan, and yellow particles, as well as mixtures thereof. Illustrative examples of suitable magenta pigments include 2,9-dimethyl-substituted quinacridone and anthraquinone dye, identified in the color index as Cl 60710, Cl Dispersed Red 15, a diazo dye identified in the color index as CI 26050, CI Solvent Red 19, and the like. Illustrative examples of suitable cyan pigments include copper tetra-4-(octadecyl sulfonamido) phthalocyanine, X-copper phthalocyanine pigment, listed in the color index as CI 74160, CI Pigment Blue, and Anthradanthrene Blue, identified in the color index as CI 69810, Special Blue X-2137, and the like. Illustrative examples of yellow pigments that may be selected include diarylide yellow 3,3-dichlorobenzidene acetoacetanilides, a monoazo pigment identified in the color index as CI 12700, CI Solvent Yellow 16, a nitrophenyl amine sulfonamide identified in the color index as Foron Yellow SE/GLN, CI Dispersed Yellow 33, 2,5-dimethoxy-4-sulfonanilide phenylazo-4'-chloro-2,5-dimethoxy aceto-acetanilide, Permanent Yellow FGL, and the like. These color pigments are generally present in an amount of from about 15 weight percent to about 20.5 weight percent based on the weight of the toner resin particles, although lesser or greater amounts may be present provided that the objectives of the present invention are met.

When the pigment particles are magnetites, which comprise a mixture of iron oxides ($Fe_3O_4$) such as those commercially available as Mapico Black from Columbian Division, Cities Services, Inc., Akron, Ohio, these pigments are present in the toner composition in an amount of from about 10 percent by weight to about 70 percent by weight, and preferably in an amount of from about 20 percent by weight to about 50 percent by weight, although they may be present in greater or lesser amounts, provided that the objectives of the invention are achieved.

The toner compositions may be prepared by any suitable method. For example, the components of the dry toner particles may be mixed in a ball mill, to which steel beads for agitation are added in an amount of approximately five times the weight of the toner. The ball mill may be operated at about 120 feet per minute for about 30 minutes, after which time the steel beads are removed. Dry toner particles for two-component developers generally have an average particle size between about 8 micrometers and about 15 micrometers. Typical dry toners for two-component developers are disclosed, for example, in U.S. Pat. Nos. 2,788,288, 3,079,342 and U.S. Pat. Reissue No. 25,136, the disclosures of which are incorporated herein in their entirety. Dry toner particles for single component developers generally have an average particle size of between about 6 micrometers and 25 micrometers. Typical toners for single toner developers include, for example, Xerox 1012 Toner for the Xerox 1012 machine and Canon NP 3000 Toner or Canon universal toner for the Canon NP-210, NP-300, NP-400, and NP-500 machines.

Any suitable external additives may also be utilized with the dry toner particles. The amounts of external additives are measured in terms of percentage by weight of the toner composition, but are not themselves included when calculating the percentage composition of the toner. For example, a toner composition containing a resin, a pigment, and an external additive may comprise 80 percent by weight resin and 20 percent by weight pigment; the amount of external additive present is reported in terms of its percent by weight of the combined resin and pigment. External additives may include any additives suitable for use in electrostatographic toners, including straight silica, colloidal silica (e.g. Aerosil R972®, available from Degussa, Inc.), ferric oxide, unilin, polypropylene waxes, polymethylmethacrylate, zinc stearate, chromium oxide, aluminum oxide, stearic acid, polyvinylidene fluoride (e.g. Kynar®, available from Pennwalt Chemicals Corporation), and the like. External additives may be present in any suitable amount, provided that the objectives of the present invention are achieved.

Any suitable carrier particles may be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles may vary, but are generally from about 50 microns to about 1,000 microns, thus allowing the particles to possess sufficient density and inertia to avoid adherence to the electrostatic images during the development process. Carrier particles may possess coated surfaces. Typical coating materials include polymers and terpolymers, including, for example, fluoropolymers such as polyvinylidene fluorides as disclosed in U.S. Pat. Nos. 3,526,533; 3,849,186; and 3,942,979, the entire disclosures of which are incorporated herein by reference. The toner may be present, for example, in the two-component developer in an amount equal to about 1 to about 5 percent by weight of the carrier, and preferably is equal to about 3 percent by weight of the carrier. The carrier, either coated or uncoated, may have an electrically insulating or electrically conductive outer surface. The expression "electrically insulating" as employed herein is defined as having a bulk resistivity of at least about $10^{12}$ ohm cm. Heretofore, as indicated above, electrostatic latent images formed by directing a stream of ions onto a dielectric layer could not form dense, high resolution images when developed with two-component developer containing carrier particles having an electrically insulating outer surface.

If desired development may be effected with any suitable liquid developer. Liquid developers are disclosed, for example, in U.S. Pat. Nos. 2,890,174 and 2,899,335, the disclosures of these patents being incorporated herein in their entirety. Typical liquid developers may comprise aqueous based or oil based inks. This includes both inks containing a water or oil soluble dye substance and pigmented inks. Typical dye substances include Methylene Blue, commercially available from Eastman Kodak Company, Brilliant Yellow, commercially available from the Harlaco Chemical Co., potassium permanganate, ferric chloride and Methylene Violet, Rose Bengal and Quinoline Yellow, the latter three available from Allied Chemical Company, and the like. Typical pigments are carbon black, graphite, lamp black, bone black, charcoal, titanium dioxide, white lead, zinc oxide, zinc sulfide, iron oxide, chromium oxide, lead chromate, zinc chromate, cadmium yellow, cadmium red, red lead, antimony dioxide, magnesium silicate, calcium carbonate, calcium silicate, phthalocyanines, benzidines, naphthols, toluidines, and the like. The liquid developer composition may comprise a finely divided opaque powder, a high resistance liquid and an ingredient to prevent agglomeration. Typical high resistance liquids include organic dielectric liquids such as Isopar, carbon tetrachloride, kerosene, benzene, trichloroethylene, and the like. Other liquid developer components or additives include vinyl resins, such as carboxy vinyl polymers, polyvinylpyrrolidones, methylvinylether maleic anhydride interpolymers, polyvinyl alcohols; cellulosics such as sodium carboxy-ethylcellulose, hydroxypropylmethyl cellulose, hydroxyethyl cellulose, methyl cellulose, cellulose derivatives such as esters and ethers thereof; alkali soluble proteins, casein, gelatin; acrylate salts such as ammonium polyacrylate, sodium polyacrylate; and the like.

Any suitable conventional xerographic development technique may be utilized to deposit toner particles on the electrostatic latent image on the imaging surface of the dielectric imaging members of this invention. Well known xerographic development techniques include, magnetic brush, cascade, powder cloud, liquid and the like development processes. Magnetic brush development is more fully described, for example, in U.S. Pat. No. 2,791.949, cascade development is more fully described, for example, in U.S. Pat. Nos. 2,618,551 and 2,618,552, powder cloud development is more fully described, for example, in U.S. Pat. Nos. 2,725,305 and 2,918,910, and 3,015,305, and liquid development is more fully described, for example, in U.S. Pat. No. 3,084,043. All of these toner, developer and development technique patents are incorporated herein in their entirety.

When a magnetic brush developer applicator is employed for development, the development subsystem employed to apply the developer to the imaging surface of this invention is preferably run at a greater speed than one utilized for high charge xerographic systems. Thus, the direction of rotation of developer applicator rolls is preferably concurrent with the electroceptor direction and the surface speed is about 3 to about 6 times the speed of the electroreceptor with optimum between about 4 and about 5 times the electroreceptor speed. This compares to a surface speed for developer applicator rolls of 2 to 3 times that of a photoreceptor in common usage for nominal charge light and lens xerographic systems. The higher ratio compensates for the lower charge density in the latent image from the ion projection head and provides more toner per unit time in the development zone. Although developability is equivalent in both cases of with and against development roll directions for these higher speed ratios, some bead loss and scavenging can occur if the developer roll is run in the direction counter to the electroceptor direction. When it is desired that the developed image comprise an image developed corresponding to the areas of charge, it is generally preferred to pass in contact therewith a developer which is triboelectrically charged to a polarity opposite to the retained charge of the latent image whereby the developer is attracted and adheres to the charged areas of the insulative image pattern. However, when it is preferred that a developed image corresponding to the uncharged (discharged) areas be reproduced, it is the general practice to employ developer charged to the same polarity as the image charge pattern. The developer will then be repelled by the charges of the latent image and will deposit on the non-charged (discharged) areas of the imaging member with the charged areas remaining absent of developer.

Image density is enhanced by the use of a development electrode. Development electrodes are wisely used in the field of electrophotography. Depending upon the particular development technique employed, the development electrode may exist as part of the developer applicator or as a separate electrode closely spaced from the imaging surface of the dielectric imaging layer. For example, the development electrode may be a cylindrical applicator for applying two-component magnetic developer to the electrostatic latent image on the imaging surface of the dielectric imaging layer. The development electrode may be of any suitable shape. Typical development electrode shapes include cylinders, flat and arcuate plates, segmented flat and arcuate plates, and the like. Satisfactory results may be achieved with a development electrode to dielectric imaging layer surface distance of between about 250 and about 2500 micrometers for dry two-component developers and of between 75 and 1000 micrometers for single component development systems. The lower limit for dry two-component developers is limited by the bead size and the magnetic brush rigidity. The upper limit is determined by the ratio of the dielectric thicknesses of the development zone and the electroreceptor such that the electrode is effective in bringing the field into the region between the development electrode and the surface of the receptor. For single component development systems, the separation limits are set by the size of the toner for contact systems and by the height of the projected toner for jumping and cloud type systems. A high potential electrical source of between about 40 volts DC and about 300 volts DC of a sign opposite to that of the corona potential, may be applied to the development electrode to achieve satisfactory image density. The lower limit of the developer bias is set by the tendency of some development systems to deposit toner in the background areas of the images when the reverse or cleaning field is below about 40 V above the background voltage. The upper limit is determined by the loss of developability caused by decreasing the contrast voltage available.

In a typical example, the charge attained from an ionographic imaging system utilizing a fluid jet assisted ion projection head can be about 17 to about 20 nanocoulombs/cm$^2$ at a 2 in/sec imaging layer surface speed. For a desired contrast voltage of about 850 volts, a polycarbonate dielectric imaging layer material having a thickness of about 125 micrometers (5 mils) and a dielectric constant of 3.1 can be used. The dielectric constant can range from about 1.5 to about 12 or even higher. The thickness divided by the dielectric constant can be about 40 to 54 optimum, but 30 to 60 has been found to be the range for satisfactory results in this material and in other materials with dielectric constants ranging from about 1.5 to about 12 or even higher for development with dry two-component developer containing carrier particles having an electrically insulating outer surface. If, for example, the dielectric constant is 7 as for polyvinyl fluoride (Tedlar, available for E. I. du Pont de Nemours & Co.), then the optimum thickness range is from about 280 micrometers (11 mils) to about 378 micrometers (15 mils) or about 11 to 15 times greater than the 25 micrometer (1 mil) thickness described in U.S. Pat. No. 4,410,584. The foregoing calculations were performed for optimum parameters based on a fluid jet assisted ion projection head that deposits a charge ranging from about 15 to about 30 nanocoulombs per cm$^2$.

Any suitable means may be used to transfer the developed image from the surface of the imaging member to the transfer or copy sheet representing the final copy. A particularly useful and generally preferred method of carrying out the transfer operation comprises an electrostatic transfer technique wherein a transfer sheet is placed in contact with the image bearing surface and an electric charge applied to the reverse side of the transfer sheet by, for example, an adjacent ion source such as a corona discharge electrode or other similar device placed in juxtaposition to the transfer member. Such an ion source may be similar to the source employed during a charging step of a conventional xerographic imaging process and is maintained at a high electrical potential with respect to the image bearing imaging member. Corona discharge results in the deposition on the transfer sheet of ionized particles which serve to charge the sheet. The transfer sheet will be charged to a polarity opposite to that of the developed image and such charge is strong enough to overcome the potential initially applied to the surface of the imaging member. A single wire corotron having applied thereto a potential of between about 3000 and about 7000 volts provides satisfactory transfer. Adhesive pick off is another form of image transfer that may be used. The electrostatic transfer process is preferred in order to obtain maximum image transfer while retaining high image resolution. When liquid developers are employed a more generally preferred method of image transfer is that of applying contact pressure when the transfer sheet is brought into surface contact with the developed image.

Any suitable material may be used as the transfer or receiving sheet for the developed image during the imaging process. The copy material may be insulating in nature or partially conductive. Typical materials are polyethylene, polyvinylchloride, polyvinyl fluoride, polypropylene, polyethylene terephthalate, ordinary bond paper, and the like.

The image transferred to the surface of the transfer or receiving sheet may be fixed to its support by any suitable means such as vapor fusing, heated roll fusing, flash fusing, oven fusing, lamination and the like. It is preferred to use the heat fixing technique in conjunction with toner developed images inasmuch as it allows for a high degree of control of the fixing phase of the process. When liquid developers are used, fixing is achieved by allowing for the evaporation of the relatively volatile carrier fluids utilized. Thus, the fixing step may be identical to that conventionally used in xerographic imaging.

The imaging member may optionally be erased by an suitable technique such as exposing the imaging surface to AC corona discharge to neutralize any residual charge on the imaging member. Typical potentials applied to an AC corona erasing device range from plus and minus about 3000 volts and about 6000 volts.

If desired, the imaging surface of the imaging member may be cleaned. Any suitable cleaning step that is conventionally used in xerographic imaging may be employed for cleaning the imaging member of this invention. Typical, well known xerographic cleaning techniques include brush cleaning, web cleaning, blade cleaning, and the like.

After transfer of the deposited toner image from the imaging member to a receiving member, the imaging member may, with or without erase and cleaning steps, be cycled through additional electrostatic latent image forming, development and transfer steps to prepare additional imaged receiving members.

Although formation of an electrostatic latent image by utilization of a fluid assisted ion stream system for imagewise discharge of uniformly precharged electroceptors of this invention is particularly preferred to achieve surface voltages and high energy fields suitable for development with any kind of developer, including standard, dry two-component developers to achieve image densities of at least about 0.7, satisfactory results may be achieved with other types of developers, such as liquid or single component conductive developers, where the electrostatic latent image is formed on an electroceptor by an ion stream with or without any prior uniform charging step.

Unlike prior art ion stream ionographic systems, the ion stream latent image forming system of this invention utilizes thick dielectric imaging layers to provide images having excellent density and resolution. In addition, when a dielectric imaging layer is applied to a subtrate there is a variation in the thickness which is inherent in the coating method employed, e.g. spray coating. This variation is a small percentage of the total thickness when the dielectric imaging layer is thick as compared to the percentage of the total thickness when the dielectric imaging layer is thin. Therefore, thicker dielectric layers are, relatively speaking, more uniform and therefore provide more uniform imaging. Although direct ion stream charging of a thin high dielectric constant electroceptor without a precharge step will not deposit sufficient charge for adequate development with a dry two-component xerographic developer containing insulating carrier particles, the high charge density and voltage employed in the system of this invention facilitate development with two-component developers and does not limit development to liquid or conductive developer development. In other words, thin prior art dielectric coatings leads to fewer toner particles being pulled from the dry two-component, insulating carrier development systems for deposition onto the electroceptor imaging surface thereby resulting in low density images due to inadequate charge density and voltage. The toner images formed from two-component developer on the imaging members of this invention are readily electrostatically transferred or pressure transfixed to a receiving member. Moreover, ion stream imaging may be conducted at lower ion stream flow rates to minimize undesirable whistling noises from the pumps, blowers, and fluid jet assisted ion projection head. Because higher latent image voltages may be obtained from thicker electroreceptors while utilizing low modulation voltage switching and lower ion stream rates, higher image density may be achieved at higher electroceptor speeds. Also, unlike prior art photoreceptors, the dielectric imaging layer of this invention is simpler and less expensive to fabricate. Characters, pictoral images, and print fonts formed in bit mapped images and impressed onto the electroreceptor by fluid assisted ion projection heads have the further advantage that each pixel imaged can be varied in density and their width and height can be varied to form a combination of both line and solid area images at the same time with the system of this invention. Such combinations of both line and solid area images are not achievable when thin electroceptors of the prior art are utilized. A further advantage over scanned laser bit mapped images is that the ion stream of this invention can be imaged continuously in both process and cross process directions while the scanned laser images are overlayed dot images (non-continuous) in the process direction. The thicker electroceptor or dielectric layer reduces expense, is easier to process and achieves greater uniformity because any tolerance variance is a small fraction of the total thickness. Also, unlike stylus imaging, the system of this invention does not form fumes and minimizes wear on the electroceptor. This invention avoids the problems of unduly low fields in thin electroceptors for driving development and excessive spreading of charge exhibited with thick electroceptors.

An electroceptor need not be photosensitive and therefore does not require special shipping and storage treatment required for photoreceptors. In addition, compared to photoreceptors, the cost and complexity necessary for protection from temperature extremes or fluctuations, exposure to sun light and the like are avoided. Further, special shutter systems required in xerographic machines to protect the photoreceptor when it is in use or when it is not in use, particularly automatic shutter systems, are unnecessary in electroceptor systems. Further, non-photoconductive dielectric receiver electroceptors are less sensitive to heat and may be located closer to fusers to provide greater flexibility in machine architecture design. Also, the electroceptor is less sensitive than photoreceptors to toner filming. In addition, the materials of an electroceptor may be tailored, particularly the surface, coefficient of friction, surface energy, and the like to accommodate different machine components such as the cleaning system. Thus, materials for different combinations of electroreceptors and cleaning blades can be chosen to reduce friction between the two components, reduce noise caused by contact during motion, and/or increase cleaning efficiency. Since the imaging head can ride directly on an electroceptor imaging surface at a spacing fixed by the supports, critical spacing requirements are readily accommodated even for electroreceptors which exhibit runout. Because of the greater durability of electroceptor materials, one may utilize higher cleaning blade pressures. Developer spacing is also facilitated because the developer applicator may also ride on the surface of the electroceptor. In systems utilizing the spacing of critical components from the electroreceptor by riding these components on the more durable surface of the electroreceptor, costs of maintaining roundness in the receptor can also be reduced. Moreover, cycle up and cycle down problems characteristic of photoreceptors are avoided with non-photoconductive electroceptors.

DESCRIPTION OF THE PREFERRED EMBODIMENTS

The invention will now be described in detail with reference to specific preferred embodiments thereof, it being understood that these examples are intended to be illustrative only. The invention is not intended to be limited to the materials, conditions, or process parameters recited herein. All parts and percentages are by weight unless otherwise indicated.

Representative dielectric imaging layer materials and process conditions for forming the layers to produce continuous films without pin holes for electroceptors are described in Examples I to XIX. A Binks spray booth Model BF-4 was used in conjunction with a Binks model 21 automatic spray gun and a type 42753 reciprocator to apply coating compositions to a cylindrical mandrel in the following Examples. This equipment is available from Binks Company, Franklin Park, Ill. The Model 21 gun was equipped with various fluid nozzles and air atomization nozzles. The coating composition to be sprayed was placed in a pressure pot and about 10 psi air pressure was applied to the pot to force the coating composition through a hose to the spray gun. The spray gun was operated in an automatic mode in conjunction with the motion of the reciprocator. The electrically conductive drum substrate to be sprayed was mounted on a turntable in the booth and rotated at a predetermined rate. The drum for Examples I to XVII were of aluminum having a length of about 24.5 cm, an outside diameter of about 84 mm and a thickness of about 4 mm. The spray gun traversed the length of the drum and spraying occurred from top to bottom in a vertical direction. The spray cycle was repeated to obtain the desired thickness.

EXAMPLE I

A primer coating solution was prepared by dissolving a film forming polymer in a solvent. The specific conditions for applying the primer coating on a plurality of aluminum drums were as follows:

| | |
|---|---|
| Materials: | 0.1 percent volume solids solution made from 1.0 gms polyester resin (DuPont 49,000, available from E. I. duPont de Nemours & Co.) |
| Solvent: | 522 gms methylene chloride and 600 gms 1,1,2 trichloroethane |
| Temperature: | 21° C. (70° F.) |
| Relative Humidity: | 48 percent |
| Drum Rotation Speed: | 185 rpm ± 10 percent |
| Gun to Drum Distance: | 23 cm (9 in) |
| Number of Passes: | 4 |
| Fluid Nozzle: | 63B |
| Air Nozzle: | 63PE |
| Needle Setting: | 1.0 |
| Gun Model: | 21 |

After drying at room temperature (22° C.) for about 2 hours, the deposited primer coating had a thickness of about 1 micrometer and a dielectric constant of about 3.28 ($10^6$ cps or Hz). The dried coating was carefully examined and found to be uniform, continuous and free of pin holes.

EXAMPLE II

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 56 gms polycarbonate resin (Makrolon) 5705, available from BASF Corporation) |
| Solvent: | 1100 gms 1,1,2 trichloroethane |
| Temperature: | 21° C. (70° F.) |
| Relative Humidity: | 42 percent |
| Drum Rotation Speed: | 185 rpm ± 10 percent |
| Gun to Drum Distance: | 23 cm (9 in) |
| Number of Passes: | 45 |
| Fluid Nozzle: | 63C |
| Air Nozzle: | 63PE |
| Needle Setting: | 1.2 |
| Gun Model: | 21 |

Each spray pass deposited on the average about 2.8 μm of dry polymer coating. The drum was rotated about 1 minute in between spray passes to allow excess solvent to evaporate thereby preventing coating sag and orange peel defects which, in turn cause coating thickness variations. Drying was effected by oven heating under the following conditions which were determined to be sufficient for defect free coatings, but not optimized for efficient drying or for minimum manufacturing costs:

22° C. for about 64 hours

60° C. for about 24 hours
90° C. for about 24 hours
120° C. for about 3 hours
22° C. for about 64 hours After drying, the deposited dielectric imaging layer coating had a thickness of about 126 micrometers (5 mils), a dielectric constant of about 2.93 ($10^6$ cps or Hz), and a surface and bulk resistivity greater than about $10^{10}$ ohm cm. The dried coating was carefully examined and found to be uniform, continuous and free of pin holes.

EXAMPLE III

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 56 gms polysulfone (P-3500, available from Union Carbide Corporation) |
| Solvent: | 522 gms methylene chloride<br>600 gms 1,1,2 trichloroethane |
| Temperature: | 21° C. (70° F.) |
| Relative Humidity: | 48% |
| Drum Rotation Speed: | 185 rpm ± 10 percent |
| Gun to Drum Distance: | 23 cm (9 in) |
| Number of Passes: | 45 |
| Fluid Nozzle: | 63B |
| Air Nozzle: | 63PE |
| Needle Setting: | 1.25 |
| Gun Model: | 21 |

Each spray pass deposited on the average about 2.8 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 127 micrometers (5 mils), a dielectric constant of about 3.1 ($10^6$ cps or Hz), and a surface and bulk resistivity of greater than about $10^{10}$ ohm cm. The dried coating was carefully examined and found to be uniform, continuous and free of pin holes.

EXAMPLE IV

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 5.6 percent by volume solids solution made from 56 gms polysulfone (P-3500, available from Union Carbide Corporation) |
| Solvent: | 522 gms methylene chloride<br>600 gms 1,1,2 trichloroethane |
| Temperature: | 23° C. (74° F.) |
| Relative Humidity: | 42% |
| Drum Rotation Speed: | 185 rpm ± 10 percent |
| Gun to Drum Distance: | 23 cm (9 in) |

-continued

| | |
|---|---|
| Number of Passes: | 9 for 1 mil |
| Fluid Nozzle: | 63B |
| Air Nozzle: | 63PE |
| Needle Setting: | 1.25 |
| Gun Model: | 21 |

Each spray pass deposited on the average about 2.8 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 25 micrometers (1 mil), a dielectric constant of about 3.1 ($10^6$ cps or Hz), and a surface and bulk resistivity of greater than about $10^{10}$ ohm cm. The dried coating was carefully examined and found to be continuous and free of pin holes, but coating thickness varied by about 10 percent.

EXAMPLE V

A dielectric imaging layer coating solution was prepared by dissolving a film forming polymer in a solvent. The specific conditions for applying the imaging layer coating on a primer coated aluminum drum prepared as described in Example I (except for rotation speed being twice as fast) were as follows:

| | |
|---|---|
| Materials: | 5.6 percent volume solids solution made from 56 gms polycarbonate-polyester resin blend (Lexan 4501, available from General Electric Co.) |
| Solvent: | 522 gms methylene chloride<br>600 gms 1,1,2 trichloroethane |
| Temperature: | 16° C. (60° F.) |
| Relative Humidity: | <58 percent |
| Drum Rotation Speed: | 300 rpm |
| Gun to Drum Distance: | 23 cm (9 in) |
| Number of Passes: | 16 |
| Fluid Nozzle: | 63B |
| Air Nozzle: | 63PE |
| Needle Setting: | 1.2 |
| Gun Model: | 21 |

Each spray pass deposited on the average about 4.7 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours The dried layer had a thickness of about 75 micrometers, a dielectric constant of about 2.93 ($10^6$ cps or Hz), and a surface and bulk resistivity of greater than about $10^{10}$ ohm cm. The dried coating was carefully examined and found to be smooth, continuous and free of pin holes, but coating thickness varied by about 10 percent.

EXAMPLE VI

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 35 gms polycarbonate resin (Makrolon 5705, available from BASF Corporation) |
| Solvent: | 1100 gms 1,1,2 trichloroethane |
| Temperature: | 23° C. (74° F.) |
| Relative Humidity: | 65 percent |
| Drum Rotation Speed: | 185 rpm ± 10 percent |
| Gun to Drum Distance: | 23 cm (9 in) |
| Number of Passes: | 33 |
| Fluid Nozzle: | 63B |
| Air Nozzle: | 63PE |
| Needle Setting: | 1.5 |
| Gun Model: | 21 |

Each spray pass deposited on the average about 2.3 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 76 micrometers (3 mils), a dielectric constant of about 2.93 ($10^6$ cps or Hz), and a surface and bulk resistivity of greater than about $10^{10}$ ohm cm.

EXAMPLE VII

A series of dielectric imaging layer coatings were prepared by dissolving a film forming polymer in a solvent. The specific conditions for applying the imaging layers on a primer coated aluminum drum (prepared as described in Example I) were as follows:

| | |
|---|---|
| Materials: | 224 gms Polycarbonate (Lexan 145, available from General Electric Co.) |
| Solvent: | 4400 gms 1,1,2 trichloroethane |
| Temperature: | 21° C. (70° F.) |
| Relative Humidity: | <58 percent |
| Drum Rotation Speed: | 185 rpm ± 10 percent |
| Gun to Drum Distance: | 23 cm (9 in) |
| Fluid Nozzle: | 63B |
| Air Nozzle: | 63PE |
| Needle Setting: | 1.6 |
| Gun Model: | 21 |

| Coating No. | Number of Spray Passes | Dry Film thickness mils (μm) |
|---|---|---|
| VII-A | 5 | 0.5 (12.7) |
| VII-B | 10 | 1 (25.0) |
| VII-C | 20 | 2 (51.8) |
| VII-D | 41 | 4 (102.6) |
| VII-E | 51 | 5 (127) |
| VII-F | 61 | 6 (152) |
| VII-G | 81 | 8 (203) |

Each spray pass deposited on the average about 2.5 μm of dry polymer coating. The drum was rotated about 1 minute between spray passes to allow excess solvent to evaporate for those coatings of up to about 4 mils thick and for about 2 minutes between spray passes for the thicker layers thereby preventing coating sag and orange peel defects which in turn cause uneven coatings. Drying was effected by oven heating using the conditions discussed in Example II. After drying, the deposited dielectric imaging layer coatings had a thickness as described in the Table above, a dielectric constant of about 2.93 ($10^6$ cps or Hz) and a surface and bulk resistivity of greater than about $10^{10}$ ohm cm. The coatings were carefully examined and found to be uniform, continuous and free of pin holes except for coatings VII A, B and C in which coating thickness varied from about 15 percent for VII A to about 10 percent for VII B and C.

EXAMPLE VIII

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 56 gms polycarbonate coester (Lexan 3250, available from General Electric Co.) |
| Solvent: | 522 gms methylene chloride<br>600 gms 1,1,2 trichloroethane |
| Temperature: | 20° C. (68° F.) |
| Relative Humidity: | 45 percent |
| Drum Rotation Speed: | 185 rpm ± 10 percent |
| Gun to Drum Distance: | 23 cm (9 in) |
| Number of Passes: | 29 |
| Fluid Nozzle: | 63B |
| Air Nozzle: | 63PE |
| Needle Setting: | 1.6 |
| Gun Model: | 21 |

Each spray pass deposited on the average about 2.6 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 76 micrometers (3 mils), a dielectric constant of about 3.1 ($10^6$ cps or Hz), and a surface and bulk resistivity of greater than about $10^{10}$ ohm cm. The dried coatings were carefully examined and found to be uniform, continuous, free of pin holes, but coating thickness varied about 10 percent.

EXAMPLE IX

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 147 gms polycarbonate coester (Lexan 4701, available from General Electric Co.) |
| Solvent: | 522 gms methylene chloride<br>600 gms 1,1,2 trichloroethane |

-continued

| | |
|---|---|
| Temperature: | 20° C. (68° F.) |
| Relative Humidity: | 45 percent |
| Drum Rotation Speed: | 185 rpm ± 10 percent |
| Gun to Drum Distance: | 23 cm (9 in) |
| Number of Passes: | 42 |
| Fluid Nozzle: | 63B |
| Air Nozzle: | 63PE |
| Needle Setting: | 1.6 |
| Gun Model: | 21 |

Each spray pass deposited on the average about 3.3 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 138 micrometers (5.5 mils), a dielectric constant of about 3.1 ($10^6$ cps or Hz), and a surface and bulk resistivity of greater than about $10^{10}$ ohm cm. The dried coatings were carefully examined and found to be uniform, continuous, free of pin holes and bubble defects.

EXAMPLE X

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 56 gms polycarbonate resin (XP 73010.00, available from Dow Chemical Co.) |
| Solvent: | 1100 gms 1,1,2 trichloroethane |
| Temperature: | 20° C. (68° F.) |
| Relative Humidity: | 45% |
| Drum Rotation Speed: | 185 rpm ± 10 percent |
| Gun to Drum Distance: | 23 cm (9 in) |
| Number of Passes: | 36 |
| Fluid Nozzle: | 63B |
| Air Nozzle: | 63PE |
| Needle Setting: | 1.3 |
| Gun Model: | 21 |

Each spray pass deposited on the average about 2.8 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 100 micrometers (4 mils), a dielectric constant of about 2.93 ($10^6$ cps or Hz), and a surface and bulk resistivity of greater than about $10^{10}$ ohm cm. The dried coating was carefully examined and found to be uniform, continuous and free of pin holes.

EXAMPLE XI

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 56 gms polycarbonate resin (Lexan 145, available from General Electric Co.) |
| Solvent: | 522 gms. methylene chloride<br>600 gms. 1,1,2 trichloroethane |
| Temperature: | 20° C. (68° F.) |
| Relative Humidity: | 47% |
| Drum Rotation Speed: | 185 rpm ± 10 percent |
| Gun to Drum Distance: | 23 cm (9 in) |
| Number of Passes: | 50 |
| Fluid Nozzle: | 63B |
| Air Nozzle: | 63PE |
| Needle Setting: | 1.6 |
| Gun Model: | 21 |

Each spray pass deposited on the average about 2.3 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 125 micrometers (5 mils), a dielectric constant of about 2.93 ($10^6$ cps or Hz), and a surface and bulk resistivity of greater than about $10^{10}$ ohm cm. The dried coating was carefully examined and found to be uniform, continuous and free of pin holes.

EXAMPLE XII

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 56 gms polycarbonate co ester (XP73036.00, available from Dow Chemical Co.) |
| Solvent: | 522 gms methylene chloride<br>600 gms 1,1,2 trichloromethane |
| Temperature: | 20° C. (68° F.) |
| Relative Humidity: | 60% |
| Drum Rotation Speed: | 185 rpm ± 10 percent |
| Gun to Drum Distance: | 23 cm (9 in) |
| Number of Passes: | 36 |
| Fluid Nozzle: | 63B |
| Air Nozzle: | 63PE |
| Needle Setting: | 1.5 |
| Gun Model: | 21 |

Each spray pass deposited about 2.8 μm of dry polymer coating. The drum was rotated about 1 minute in between spray passes to allow excess solvent to evaporate thereby preventing coating sag and orange peel defects which, in turn cause coating thickness nonuniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 100 micrometers (4 mils), a dielectric constant of about 2.93 ($10^6$ cps or Hz), and a surface and bulk resistivity of greater than about $10^{10}$ ohm cm. The dried coating was carefully examined and found to be uniform, continuous and free of pin holes.

EXAMPLE XIII

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 56 gms polyetherimide resin (Ultem 1000, available from General Electric Co.) |
| Solvent: | 522 gms methylene chloride<br>600 gms 1,1,2 trichloroethane |
| Temperature: | 20° C. (68° F.) |
| Relative Humidity: | 47 percent |
| Drum Rotation Speed: | 185 rpm ± 10 percent [TC-200] |
| Gun to Drum Distance: | 23 cm (9 in) |
| Number of Passes: | 39 |
| Fluid Nozzle: | 63B |
| Air Nozzle: | 63PE |
| Needle Setting: | 1.5 |
| Gun Model: | 21 |

Each spray pass deposited about 2.6 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 102 micrometers (4 mils), a dielectric constant of about 3.1 and a resistivity of about $10^{10}$ ohm-cm. The dried coating was carefully examined and found to be uniform, continuous and free of pin holes.

EXAMPLE XIV

A dielectric imaging layer was prepared by dissolving a film forming polymer and a primer adhesive together in a blend comprising 56 gms polycarbonate coester (Lexan 4701, available from General Electric Co.) and 2 gms of polyester resin (DuPont 49,000, available from E. I. duPont de Nemours & Co.) in a solvent blend of 522 gms methylene chloride and 1,1,2-trichloroethane. The polymer blend solution was coated using the spray and drying conditions of Example VIII on a non-primed aluminum drum which was previously vapor degreased. After drying, the deposited dielectric imaging layer coating had a thickness of about 125 micrometers (5 mils), a dielectric constant of about 3.1 and a surface resistivity of greater than $10^{10}$ ohm-cm. The dried coating was carefully examined and found to be firmly adhering to the aluminum substrate, uniform, continuous and free of pin holes.

EXAMPLE XV

A dielectric imaging layer was prepared by mixing 3 volumes of Imron 500S clear enamel with 1 volume of Imron 192S activator polyurethane composition and the viscosity adjusted with 8485S solvent to a DuPont viscosity cup of 18–22 seconds. The Imron enamel, activator and diluent were obtained from E. I. duPont de Nemours & Co. The polyurethane was applied to a vapor degreased aluminum roll by spray coating and then air dried for 8 hours at 60° C. followed by heating for 2 hours at 100° C. to achieve a dry coating thickness of 200 micrometers (8 mils). The dielectric imaging layer was continuous, free of pinholes, had a dielectric constant of about 4, and exhibited a surface resistivity of greater than $10^{10}$ ohm-cm. The coating firmly adhered to the substrate and had a uniform thickness of ±2.5% end to end and ±5% around the roll. When the roll was corona charged to about 1500 volts with a negative potential, the voltage variation on the coating around the drum was $<50$ v.

EXAMPLE XVI

A dielectric imaging layer was prepared as described in Example XIV except that 56 gms of a copolyester polymer (PETG 6763, available from Eastman Chemical Products, Inc. a subsidiary of Eastman Kodak Co.) composed of copoly (1,4-cyclohexylendimethylene/ethylene) terephthalate) was used in place of the Lexan 4701. After drying, the deposited dielectric imaging layer had a thickness of about 150 micrometers (6 mils), a dielectric constant of about 3.5 and a surface resistivity of greater than $10^{10}$ ohm-cm. The dried coating was uniform in thickness and free of pinholes.

EXAMPLE XVII

A dielectric imaging layer was prepared by dissolving Lexan 3250 polycarbonate polymer in a solvent blend of methylene chloride and 1,1,2-trichloroethane as described in Example VIII in which 60 weight percent of $BaTiO_3$ (available from Ferro Corporation), based on the weight of the polymer, was dispersed by roll milling with glass beads to obtain a uniform dispersion. The composition was diluted with additional solvent to obtain a spray coatable consistency. The composition was applied to a primer coated aluminum drum (prepared as described in Example 1) and dried for 24 hours at 60° C., 90° C. for 24 hours, and 120° C. for 3 hours. The deposited dielectric imaging layer coating had a thickness of about 288 micrometers (11.5 mils), a dielectric constant of about 6.8 and a surface resistivity of greater than $10^{10}$ ohm-cm. The layer was white, continuous, uniform and free of pinholes.

EXAMPLE XVIII

Nickel drums having a length of about 245 mm, an outside diameter of about 84 mm and a thickness of about 0.2 mm were coated with a polyvinyl fluoride polymer (Tedlar, available from E. I. Du Pont de Nemours & Co.) dispersion. The coating dispersion were applied to the drums using a doctor metering process which was capable of forming a coating having a thickness (after drying) up to about 500 micrometers by adjusting a gap between a doctor blade and an adjacent drum wall. The rheology of the coating dispersion was controlled by adjusting the resin solids, milling process conditions, and additives such as described in U.S. Pat. No. 4,698,382 (duPont) and in a paper entitled "Poly(-Vinyl Fluoride) Properties and Coating Technology" by J. J. Dietrick, T. E. Hedge, and M. E. Kiecsma, presented at the 8th Annual Symposium on New Coatings and New Coatings Raw Materials, sponsored by the North Dakota State University Polymer and Coatings Department, May 30, 1966, so that sagging, orange peel and other coating thickness variations were minimized. The coatings were coalesced at 200° C. for 10 minutes and then dried for 20 minutes at 200° C. Coatings were produced with thickness from about 100 micrometers (4 mils) up to about 500 micrometers (20 mils), in increments of 50 micrometers (2 mils), a dielectric constant of about 7.9 (depending on the coating additives employed), and a surface resistivity of greater than $10^{10}$ ohm-cm. The coatings were continuous, uniform and free of pinholes. Coating thicknesses from end to end were ±2.5 percent and ±5 percent around the drums. Generally, those drum coatings having a thickness of from 225 micrometers (9 mils) and a dielectric constant of 7 up to coatings having a thickness of 450 micrometers (18 mils) and a dielectric constant of 9 were found to produce good test prints when employed in the device described in Example XX below.

EXAMPLE XIX

A dielectric imaging layer coating solution was prepared by dissolving a film forming polymer in a solvent. The specific conditions for applying the imaging layer coating on a primer coated aluminum drum prepared as described in Example I were as follows:

| | |
|---|---|
| Materials: | 56 gms polycarbonate coester (XP73038.00, available from Dow Chemical Co.) |
| Solvent: | 522 gms methylene chloride<br>600 gms 1,1,2 trichloroethane |
| Temperature: | 20° C. (68° F.) |
| Relative Humidity: | 60% |
| Drum Rotation Speed: | 185 rpm ± 10 percent |
| Gun to Drum Distance: | 23 cm (9 in) |
| Number of Passes: | 27 |
| Fluid Nozzle: | 63B |
| Air Nozzle: | 63PE |
| Needle Setting: | 1.5 |
| Gun Model: | 21 |

Each spray pass deposited about 2.8 μm of dry polymer coating. The drum was rotated about 1 minute in between spray passes to allow excess solvent to evaporate thereby preventing coating sag and orange peel defects which, in turn cause coating thickness non-uniformities. Drying was effected by oven heating under the following conditions:

22° C. for about 64 hours
60° C. for about 24 hours
90° C. for about 24 hours
120° C. for about 3 hours
22° C. for about 64 hours After drying, the deposited dielectric imaging layer coating had a thickness of about 76 micrometers (3 mils), a dielectric constant of about 2.93 ($10^6$ cps or Hz), and a surface and bulk resistivity of greater than about $10^{10}$ ohm-cm.

EXAMPLE XX

The electrographic drums of Examples II through XIX were substituted for the xerographic drum in a modified Xerox 2830 xerographic copier which utilizes biased magnetic brush development. The Xerox 2830 xerographic copier, prior to modification, comprised an electrophotographic drum around the periphery of which are mounted a charging station to deposit a uniform electrostatic charge, an exposure station, a magnetic brush development station, a paper sheet feeding station, an electrostatic toner image transfer station, a toner image fusing station, and a blade cleaning station. The Xerox 2830 xerographic copier was modified to substitute a fluid jet assisted ion projection head similar to the head illustrated in FIG. 2 for the exposure station of the copier. The magnetic brush developer employed comprised toner particles having an average particle size of about 12 micrometers and comprising a styrene copolymer pigmented with about 10 percent carbon black and carrier particles having an average size between about 50 and about 100 micrometers comprising uncoated, insulating ferrite particles. The magnetic brush developer also contained minor amounts of an external additive comprising zinc stearate and colloidal silica particles. The adjustable biasing power supply connected to the magnetic brush developing station allowed testing of the samples under various image development conditions of from 0 to 40% of the latent image potential. By introducing this reverse bias, of the same polarity as the ions forming the latent image, and applying the bias between the conductive layer of the electrographic drums and the development roll, non-uniformities in the non-image areas of the latent image can be kept more free of unwanted toner particles. Referring to the fluid jet assisted ion projection head illustrated in FIG. 2 for the type of head substituted for the exposure system, the upper casting 51 was cast of stainless steel. The conductive plate 58, insulating layer 60, and thin film element layer 63 were supported on a planar substrate 64 having a thickness of about 1,016 micrometers. A pair of extensions on each side of planar substrate 64 form wiping shoes which rode upon the outboard edges of the dielectric image layer 66 spaced the ion projection head 50 about 760 micrometers from the imaging surface of dielectric image layer 66. The exit channel 68 included an cavity exit region 70 about 250 micrometers (10 mils) long and an ion modulation region 71 about 508 micrometers (20 mils) long. A planar substrate 64 was employed comprising a large area marking chip comprising a glass plate upon which was integrally fabricated thin film modulating electrodes, conductive traces and transistors. The width across the cavity 54 was about 3175 micrometers (125 mils) and corona wire 56 was spaced about 635 micrometers (25 mils) from the cavity wall 62 nearest the cavity exit. A high potential source 72 of about +3,600 volts was applied to corona wire 56 through a one megohm resistance element 74 and a reference potential 76 +1,200 volts applied to cavity walls 62. The individually switchable thin film element layer 63 (an array of 300 control electrodes per inch not shown) were each connected through standard multiplex circuitry (represented by two position switch 80) to a low voltage source 78 of +1,220 volts or +1,230 volts, 10 to 20 volts above the reference potential. Each electrode controlled a narrow "beam" of ions in the curtain-like air stream that exited from ion modulation region 71.

The conductive electrodes were about 89 micrometers (3.5 mils) wide each separated from the next by 38 micrometers (1.5 mils). The distance between the thin film element layer 63 and cavity wall 62 at the closet point was about 75 micrometers (3 mils). Laminar flow conditions prevailed at air velocities of about 1.2 cubic feet per minute. The metal drum of each of the tested samples were electrically grounded. In operation, the imaging surface on the dielectric imaging layer on each electrographic drum was uniformly charged to about −1500 volts at the charging station, imagewise discharged to −750 volts with the ion stream exiting from the fluid jet assisted ion projection head to form an electrostatic latent image having a difference in potential between background areas and the image areas of about 150 volts, and developed with toner particles deposited from the two-component magnetic brush developer applied at the magnetic brush development station.

The dielectric imaging layers of Examples II, III, VII D, VII E, VII F, IX, X, XI, XII, XIII, XIV, XV, XVI, XVII, and XVIII all repeatedly produced print images having about 1.2 density units, resolution up to 300 lines or spots per inch, no discernable image spread or blooming and clean background in tests of several hundred print cycles. The dielectric image layers of Examples IV, V, VI, VII A, VII B, VII C, VIII, and XIX produced print densities of less than about 0.6, but image resolution was good and print background was low. Dielectric imaging layer VII G produced the highest image density at about 1.3, but the images were broader or had bloomed to dimensions greater than that of the original input.

The developer housing of the modified Xerox 2830 Machine was purged of the two component developer material and loaded with a developer consisting of single component toner particles. The toner particles comprised a styrene copolymer pigmented with carbon black and magnetite and had an average particle size of about 12 micrometers. The developer housing was spaced about 10 mils (254 micrometers) from the dielectric imaging surface. An electrostatic latent image was formed on the dielectric imaging layer of Example XV as described above and developed with the single component developer. The images produced had a density of about 1.0, resolution of 300 spots per inch, clean background and no discernable image blooming.

EXAMPLE XXI

Polyimide film (Kapton, available from E. I. du Pont de Nemours & Co.) having a length of about 990 mm a width of about 305 mm and a thickness of about 75 micrometers was coated on both sides with a coating of fluorocarbon resin (Teflon FEP, available from E. I. du Pont de Nemours & Co.) having a thickness about 25 micrometers on each surface to yield a composite sheet having a thickness of about 125 micrometers. This composite sheet was spray coated on one of the fluorocarbon resin surfaces with a carbon black pigment dispersion in an olefinic binder (LE 12644, available from Red Spot Paint and Varnish Co. Inc.). The resulting conductive carbon black coating was about 10 micrometers thick after drying. Since the dielectric constants of the Kapton film and FEP fluoropolymer were 3.7 and 2.1, respectively, the composite sheet had an effective dielectric constant of about 2.7 for the combined layers. The ends of the coated sheet were overlapped and forced together for 20 seconds using a jaw sealer device operating at about 350° C. and 20 psi to form an endless belt. The belt was cycled in a test fixture equipped with a belt drive and fitted with a fluid jet assisted ion projection head similar to the head illustrated in FIG. 2, a developer applicator station, paper transport station, image transfer station, toner fusing station and cleaning station. The images produced under the charging conditions described in Example XX had a resolution of 300 spots per inch and achieved a print density to about 1.1.

EXAMPLE XXII

Dielectric imaging layers were prepared using an electrostatic coating technique. The substrates coated were aluminum drums having a 65 mm diameter, 266 mm length, 2.5 mm wall thickness (nominal) and surface roughness of about 0.4 μm, (16μinch). The substrates were cleaned by ultrasonic immersion cleaning in detergent followed by a freon vapor degrease, and a final isopropanol hand wipe with a lint free cloth. A Nordson Model #NPE CC8 with a Nordson Model #NPE-2A automatic gun was used to electrostatically apply coating powder to the drums while the drums were rotated at 100–150 RPM, (horizontal). The electrostatic gun horizontally traversed the drums at 0.5 to 1.0 inches/-sec. Nitrogen gas was used for powder delivery and atomization. Typical powder delivery settings were:

| | |
|---|---|
| Atomization | 12 to 20 PSI |
| Delivery | 8 to 20 PSI |

The powder coating materials and conditions for coating and curing were as follows:

| | |
|---|---|
| a) Perfluoroalkoxy Teflon (PFA, available from E. I. duPont de Nemours & Co.) | |
| Dielectric constant | 2.1 ($10^6$ cps or Hz) |
| Surface & Bulk Resistivity | $>10^{10}$ ohm cm |
| Gun voltage | 70 kv |
| Dry Thickness | 0.0035 in (88.9 μm). 3 coats/bakes |
| Thickness/Dielectric constant | 42 μm |
| Cure temp./time | 740° F. (393° C.). 20 minutes |
| b) Co-polymer of ethylene and tetrafluoroethylene (Tefzel, available from E. I. duPont de Nemours & Co.) | |
| Dielectric constant | 2.6 ($10^6$ cps or Hz) |
| Surface & Bulk Resistivity | $>10^{10}$ ohm cm |
| Gun voltage | 70 kv |
| Dry Thickness | 0.0045 in (114.3 μm). 4 coats/bakes |
| Thickness/Dielectric constant | 44 μm |
| Cure temp./time | 575° F. (302° C.), 30 minutes |
| c) Acrylic Resin (Pulvalure 154 series, available from Glidden Coating and Resins) | |
| Dielectric constant | 3.3 ($10^6$ cps or Hz) |
| Surface & Bulk Resistivity | $>10^{10}$ ohm cm |
| Gun voltage | 40–50 kv |
| Dry Thickness | 0.0055 in (139.7 μm), 3 coats/bakes |
| Thickness/Dielectric constant | 42 μm |
| Cure temp./time | 350° F. (177° C.), 15 minutes |
| d) Clear polyurethane resin (Vedoc, available from Ferro Corp.) | |
| Dielectric constant | 4.0 ($10^6$ cps or Hz) |
| Surface & Bulk Resistivity | $>10^{10}$ ohm cm |
| Gun voltage | 55–70 kv |
| Dry Thickness | 0.006 in (152.4 μm), 3 coats/bakes |
| Thickness/Dielectric constant | 38 μm |
| Cure temp./time | 290° F. (143° C.), 25 minutes |
| e) Crystal clear polyester (Oxyplast, glycidyl polyester, available from Fuller O'Brien Paint Co.) | |
| Dielectric constant | 4.0 ($10^6$ cps or Hz) |
| Surface & Bulk Resistivity | $>10^{10}$ ohm cm |
| Gun voltage | 70–90 kv |
| Dry Thickness | 0.006 in (152.4 μm), 3 coats/bakes |

-continued

| | |
|---|---|
| Thickness/Dielectric constant | 38 μm |
| Cure temp./time | 400° F. (204° C.), 20 minutes |
| f) Clear Epoxy (Vedoc VE 101-A, available from, Ferro Corp.) | |
| Dielectric constant | 3.5 ($10^6$ cps or Hz) |
| Surface & Bulk Resistivity | $>10^{10}$ ohm cm |
| Gun voltage | 55-70 kv |
| Dry Thickness | 6 mils (152.4 μm), 3 coats/bakes |
| Thickness/Dielectric constant | 44 μm |
| Cure temp./time | 350° F. (177° C.), 30 minutes |

The Xerox 2830 xerographic copier modified as described in Example XX was again modified so that the aluminum drums of Example XXII could be substituted in the place of the drums of Examples II to XIX. The fluid jet assisted ion projection head had an array of 600 control electrodes per inch. The magnetic brush developer, the cleaning subsystem, paper sheet feeding system, fusing system and charging corotron were repositioned so that the spacing, charging and motion relationships were maintained as in Example XX. The dielectric imaging layers all produced excellent prints of about 1.1 density units, resolution of 600 lines or spots per inch, sharp well defined character edges and corners, and clean background free of toner deposits. The dielectric imaging layer of XXII a) was exceptionally easy to clean using a polyurethane wiper blade material.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. An ionographic imaging process comprising providing an ionographic imaging member comprising a conductive layer and at least one uniform continuous dielectric imaging layer free of voids comprising a film forming polymer, said imaging layer having an imaging surface, a dielectric constant of between about 1.5 and about 40, a bulk resistivity of at least about $10^{10}$ ohm cm at a relative humidity between about 10 percent and about 80 percent at a temperature between about 16° C. and about 50° C., and a thickness of at least about 45 micrometers, said thickness divided by said dielectric constant having a value of between about 30 and about 60; directing a stream of ions in image configuration onto said imaging surface thereby forming an electrostatic latent image on said imaging surface; and contacting said imaging surface with electrostatically attractable marking particles to form a deposit of said particles on said imaging surface in conformance with said electrostatic latent image.

2. An ionographic imaging process according to claim 1 wherein a development roll or electrode is positioned adjacent to said imaging surface and an electrical bias is supplied from said conductive layer of said dielectric layer to said development roll or electrode of between about 0.05 and 0.4 times the voltage of said latent image and is of the same polarity as the ions forming the electrostatic latent image.

3. An ionographic imaging process comprising providing an ionographic imaging member comprising a conductive layer and at least one uniform continuous dielectric imaging layer free of voids comprising a film forming polymer, said imaging layer having an imaging surface, a dielectric constant of between about 1.5 and about 40, a bulk resistivity of at least about $10^{10}$ ohm cm at a relative humidity between about 10 percent and about 80 percent at a temperature between about 16° C. and about 50° C., and a thickness of at least about 45 micrometers, said thickness divided by said dielectric constant having a value of between about 30 and about 60; uniformly depositing on said imaging surface an electrostatic charge of a first polarity, directing onto said imaging surface a stream of ions of a polarity opposite said charge of said first polarity to discharge in image configuration the uniformly deposited charge of said first polarity thereby forming an electrostatic latent image on said imaging surface; and contacting said imaging surface with electrostatically attractable marking particles to form a deposit of said marking particles on said imaging surface in conformance with said electrostatic latent image.

4. An ionographic imaging process according to claim 3 wherein a development roll or electrode is positioned adjacent to said imaging surface and an electrical bias is supplied from said conductive layer of said dielectric layer to said development roll or electrode of between about 0.05 and 0.4 times the difference between the voltage of said latent image and the voltage of said uniformly deposited electrostatic charge this difference being added to the voltage of said uniformly deposited charge.

5. An ionographic imaging process according to claim 4 wherein said a stream of ions is directed onto said imaging surface with the aid of a pressurized fluid.

6. An ionographic imaging process according to claim 3 wherein said electrostatic charge of said first polarity is between about −50 volts and about −2000 volts and said stream of ions of a polarity opposite said charge of said first polarity forms an electrostatic latent image on said imaging surface having a difference in potential between background areas and image areas of between about 75 volts and about 1000 volts.

7. An ionographic imaging process according to claim 3 wherein said electrostatic charge of said first polarity is greater than the potential created on said imaging surface by triboelectrification contact between said imaging surface and any other material during said imaging process.

8. An ionographic imaging process according to claim 3 wherein said imaging surface is contacted with said electrostatically attractable marking particles admixed with larger carrier particles having an electrically insulating outer surface.

9. An ionographic imaging process according to claim 8 wherein said electrostatically attractable marking particles comprise dry toner particles having an average particle size of between about 8 micrometers and about 15 micrometers.

10. An ionographic imaging process according to claim 8 wherein said deposit of said marking particles on said imaging surface has a density of at least about 0.7.

11. An ionographic imaging process according to claim 3 wherein said imaging surface is contacted with said electrostatically attractable marking particles admixed with larger carrier particles having an electrically conductive outer surface.

12. An ionographic imaging process according to claim 3 wherein said imaging surface is contacted with said electrostatically attractable marking particles dispersed in a liquid.

13. An ionographic imaging process according to claim 3 wherein said electrostatically attractable marking particles consist essentially of a dry single component toner.

14. An ionographic imaging process according to claim 3 including transferring said deposit of said marking particles from said imaging surface to a receiving member.

15. An ionographic imaging process according to claim 14 cleaning said imaging surface after said transferring of said deposit of said marking particles from said imaging surface to said receiving member.

16. An ionographic imaging process according to claim 3 wherein said ionographic imaging member is a component in a removable cassette.

* * * * *